United States Patent
Shen et al.

(10) Patent No.: US 10,299,232 B2
(45) Date of Patent: May 21, 2019

(54) METHOD, SYSTEM AND APPARATUS FOR ENABLING VEHICULAR COMMUNICATIONS

(71) Applicants: Xuemin Shen, Waterloo (CA); Hassan Aboubakr Omar, Waterloo (CA); Ning Lu, Kamloops (CA); Sailesh Bharati, Waterloo (CA); Weihua Zhuang, Waterloo (CA)

(72) Inventors: Xuemin Shen, Waterloo (CA); Hassan Aboubakr Omar, Waterloo (CA); Ning Lu, Kamloops (CA); Sailesh Bharati, Waterloo (CA); Weihua Zhuang, Waterloo (CA)

( * ) Notice: Subject to any disclaimer, the term of this patent is extended or adjusted under 35 U.S.C. 154(b) by 115 days.

(21) Appl. No.: 15/519,526

(22) PCT Filed: Oct. 14, 2015

(86) PCT No.: PCT/CA2015/051038
§ 371 (c)(1),
(2) Date: Apr. 14, 2017

(87) PCT Pub. No.: WO2016/058099
PCT Pub. Date: Apr. 21, 2016

(65) Prior Publication Data
US 2017/0238270 A1  Aug. 17, 2017

Related U.S. Application Data

(60) Provisional application No. 62/143,368, filed on Apr. 6, 2015, provisional application No. 62/122,214, filed on Oct. 15, 2014.

(51) Int. Cl.
*H04W 56/00* (2009.01)
*H04W 76/10* (2018.01)
(Continued)

(52) U.S. Cl.
CPC ......... *H04W 56/001* (2013.01); *G08B 21/18* (2013.01); *H04J 3/0644* (2013.01); *H04J 3/0655* (2013.01);
(Continued)

(58) Field of Classification Search
CPC . H04W 56/001; H04W 56/0025; H04J 3/065; H04J 3/0655; H04J 3/0682
See application file for complete search history.

(56) References Cited

U.S. PATENT DOCUMENTS 5,276,659 A * 1/1994 Kotaki ............... G06F 1/14
368/10
2004/0220933 A1  11/2004 Walker
(Continued)

OTHER PUBLICATIONS

Omar et al., "VeMAC: A TDMA-Based MAC Protocol for Reliable Broadcast in VANETs", IEEE transacation on mobile computing, vol. 12, No. 9, Sep. 2013 (Sep. 2013).

*Primary Examiner* — Hassan Kizou
*Assistant Examiner* — Deepa Belur

(57) ABSTRACT

The invention generally relates to the field of vehicular communications. In particular, the invention relates to method, system and apparatus for establishing and maintaining vehicular communications, such as wireless vehicular communications in a vehicular ad hoc network (VANET).

21 Claims, 18 Drawing Sheets

(51) Int. Cl.
*G08B 21/18* (2006.01)
*H04W 4/12* (2009.01)
*H04J 3/06* (2006.01)
*H04W 4/04* (2009.01)
*H04W 72/04* (2009.01)
*H04W 84/18* (2009.01)

(52) U.S. Cl.
CPC ............ *H04W 4/046* (2013.01); *H04W 4/12* (2013.01); *H04W 56/00* (2013.01); *H04W 72/0446* (2013.01); *H04W 76/10* (2018.02); *H04W 84/18* (2013.01)

(56) References Cited

U.S. PATENT DOCUMENTS

| | | | |
|---|---|---|---|
| 2010/0146562 A1* | 6/2010 | Asahara | H04H 40/09 725/75 |
| 2014/0292570 A1* | 10/2014 | Wallace | G01S 19/41 342/357.42 |
| 2015/0110065 A1* | 4/2015 | Gaal | H04W 16/14 370/330 |
| 2017/0188290 A1* | 6/2017 | Hayee | H04W 4/80 |
| 2018/0246831 A1* | 8/2018 | Moeller | G06F 13/385 |

\* cited by examiner

METHOD, SYSTEM AND APPARATUS FOR ENABLING VEHICULAR COMMUNICATIONS

FIELD OF INVENTION

The invention relates generally to the field of vehicular communications. In particular, the invention relates to method, system and apparatus for establishing and maintaining vehicular communications, such as wireless vehicular communications in a vehicular ad hoc network (VANET).

BACKGROUND OF INVENTION

Today, road accidents represent a serious public problem and are one of the leading causes of people death and disability in many countries. For instance, in Canada, there were more than 2200 deaths and about 170,500 injuries as a result of traffic collisions in 2010. This severe social impact of traffic accidents comes in addition to the financial losses due to traffic congestion, as well as vehicle and property damage, which indicates an urgent need of efficient solutions to this socioeconomic problem of traffic accidents.

To reduce the risk and severity of a vehicle crash on road, wireless communications can be employed among vehicles moving in the vicinity of each other (vehicle-to-vehicle, or V2V), or among vehicles and specially deployed road-side units (RSU) (vehicle-to-RSU, or V2R). Communications so established in a distributed manner (i.e., without the need of any central controller), form what is generally known as a vehicular ad hoc network (VANET). Based on vehicle-to-vehicle and vehicle-to-RSU communications, a wide variety of VANET-based advanced safety applications can be realized, including lane change warning, highway merge assistance, in-vehicle signage, and cooperative forward collision avoidance. By deploying such VANET-based safety applications, studies done by the National Highway Traffic Safety Administration (NHTSA) at the United States Department of Transportation (USDOT) show that approximately 80% of the crash scenarios can be prevented, indicating a great potential of VANETs in enhancing road safety.

The majority (if not all) of the VANET safety applications require that each node (i.e., vehicle or RSU) broadcasts safety messages to all the surrounding nodes both periodically and also in case of an unexpected safety event. Some unexpected safety events may include a hard brake, an approaching emergency vehicle, or hazardous road condition detection. Failure or delay in delivering a safety message may shorten the reaction time available to a driver, thus resulting in undesired consequences. It is therefore desirable that each node successfully and timely delivers its safety messages to all the surrounding nodes. A medium access control (MAC) protocol for VANETs, such as VeMAC protocol to be further described herein, should support a reliable broadcast service, thus allowing such timely delivery of safety messages.

One solution proposed for MAC in VANETs is the IEEE 802.11p standard. This is a solution based on the legacy IEEE 802.11 standard (WiFi), which has been developed mainly for unicast communications. This standard has considerable limitations when used to support the broadcast-based safety applications in VANETs. For example, for unicast communications, a request-to-send/clear-to-send (RTS/CTS) handshaking mechanism is often used to mitigate the hidden terminal problem. However, for a broadcast packet (the term packet refers to a MAC layer protocol data unit) according to the IEEE 802.11p standard, no RTS/CTS exchange should be used and no acknowledgment (ACK) should be transmitted by any of the recipient of the broadcast packet (the packet type used to carry a safety message). This absence of RTS/CTS exchange results in a hidden terminal problem, which reduces the rate of successful packet delivery of the IEEE 802.11p broadcast service, especially with the lack of ACK packets. Another limitation of the IEEE 802.11p standard is that it employs enhanced distributed channel access (EDCA) scheme to support safety applications. Event-driven and periodic safety messages are likely to be assigned to the highest access categories (ACs) according to this scheme. Therefore, these safety messages will contend for the channel by using a small contention window (CW) size, as specified in the IEEE 802.11p standard. Although this small CW size allows the safety messages to be transmitted with small delays, it increases the probability of transmission collisions when multiple nodes within the same communication range simultaneously broadcast their safety messages. Additionally, unlike the unicast case, the CW size is not doubled when a collision happens among the broadcast safety messages, since there is no collision detection for the broadcast service due to the absence of CTS and ACK mechanism.

The forgoing creates challenges and constraints for establishing and maintaining vehicular communications. It is an object of the present invention to mitigate or obviate at least one of the above mentioned disadvantages.

SUMMARY OF INVENTION

The present invention is directed to method, system and apparatus for establishing and maintaining vehicular communications, such as wireless vehicular communications in a vehicular ad hoc network (VANET).

In one aspect of the invention, there is provided a method of establishing and maintaining vehicular communications among nodes in a vehicular ad hoc network (VANET) established according to a media access control ("MAC") protocol. The MAC protocol has a time division scheme dividing a periodic time duration into a plurality of indexed time slots. The method includes the steps of, local at each node of the nodes in a two-hop neighborhood of the VANET, receiving at the local node a wireless time reference signal from an external time reference signal source, the time reference signal providing consecutive timing markers separated by a reference time duration; measuring clock discrepancy between an on-board clock counter of the local node and an external reference clock using the consecutive timing markers contained in the external time reference signal; upon receiving a timing marker, a) synchronize the time division scheme at the local node to the received timing marker by synchronizing a pre-selected time slot of the time division scheme to the received timing marker and compensating for the clock discrepancy by distributing the total amount of clock discrepancy accumulated in the reference time duration uniformly over all indexed time slots in the reference time duration, and b) selecting at least one indexed time slot of the time division scheme for message broadcasting at the local node; during the periodic time duration and until receiving a subsequent timing marker at the local node, i) verifying that the at least one selected time slot is not selected by any other nodes in the neighborhood of the local node and, if any one of the at least one selected time slot is occupied by any other node, deselecting the occupied time slot and selecting a different time slot to assign to the local node; ii) transmitting one or more messages of the local node in the at least one selected time slot, the one or more messages including node identification and time slot selection information of the local node's one-hop neighborhood; and iii) receiving messages from all other nodes in the neighborhood in indexed time slots not assigned to the local node.

According to a feature of this aspect of the invention, the method further includes the steps of detecting a deadlock condition of the local node, and, upon detection of the deadlock condition, deselecting all of the at least one selected time slot assigned to the local node and, for each of the at least deselected time slot, selecting a different time slot not selected by the any other nodes and the local node.

According to another feature, the time division scheme partitions the periodic time duration into a first integer number of time frames and divides each of the time frames into a second integer number of time slots, and wherein the first time slot of the first time frame is synchronized to the received timing marker. As a further feature, the method includes the step of, at least in one of the time frames, identifying from the messages received from all other nodes a set of unoccupied time slots consisting of time slots not selected by any of the nodes. The at least one indexed time slot selected for message broadcasting is selected from the set of unoccupied time slots.

According to yet another aspect of the invention, the external time reference signal is time signal provided by a GPS (Global Positioning System) satellite in its GPS signal and the consecutive timing markers are the 1PPS (one-pulse-per-second) pulse edge of the GPS time signal. As a feature, location information and speed information can be extracted from the GPS signal, included in the one or more messages to be broadcast and the method further includes broadcasting the location and speed information in the at least one selected time slot. As a further feature, the method includes the steps of including the location and speed information and the acceleration information in the local node's status information, calculating a predicted trajectory of movement of the local node, and generating an internal safety message from the location and speed information, the acceleration information and the projected trajectory of all nodes. If the internal safety message predicts imminent danger, then communicate a warning message to an operator of the local node.

According to another aspect of the invention, there is provided a vehicle configured to establish and maintain vehicular communications with and among nodes in a vehicular ad hoc network (VANET) that is established according to a media access control ("MAC") protocol. The MAC protocol has a time division scheme dividing a periodic time duration into a plurality of indexed time slots. The vehicle includes a wireless signal receiver for receiving a wireless time reference signal from an external time reference signal source, the time reference signal providing consecutive timing markers separated by a reference time duration; a microcontroller coupled to the wireless signal receiver, the microcontroller having a clock timer, the wireless signal receiver being coupled to the microcontroller and providing the timing markers to the microcontroller, the microcontroller being configured to calibrate the clock timer using the consecutive timing markers received by the wireless signal receiver and to select at least one indexed time slot of the time division scheme for message broadcasting at the communication device; a wireless message transceiver, the wireless message transceiver being controlled by the microcontroller to receive and send messages; and an application message processor coupled to the microcontroller, the application message processor processing status information of the vehicle and package the status information to node messages for the microcontroller to pass to the wireless message transceiver to broadcast during each one of the at least one selected time slot assigned to the vehicle and to process messages received by the wireless message transceiver from all other nodes in indexed time slots not assigned to the local node.

According to yet another aspect of the invention, there is provided a communication device for installation in a vehicle to establish and maintain vehicular communications among nodes in a two-hop neighborhood in a vehicular ad hoc network (VANET) established according to a media access control ("MAC") protocol. The MAC protocol has a time division scheme dividing a periodic time duration into a plurality of indexed time slots of a pre-selected time length. The communication device has a wireless signal receiver for receiving a wireless time reference signal at the vehicle from an external time reference signal source, the time reference signal providing consecutive timing markers separated by a reference time duration; a microcontroller coupled to the wireless signal receiver, the microcontroller having a timer, the wireless signal receiver being coupled to the microcontroller and providing the timing markers to the microcontroller, the microcontroller being configured to calibrate the timer using the consecutive timing markers of the time reference signal received from the wireless signal receiver and to assign at least one indexed time slot to the communication device for message broadcasting; a wireless message transceiver, the wireless message transceiver being controlled by the microcontroller to broadcast messages in the assigned at least one selected time slot and receive messages in other time slots; a data communication interface coupled to one or more sensors installed on the vehicle, the one or more sensors collecting status information of the vehicle; and an application message processor coupled to the data communication interface and the microcontroller, the application message processor processing the status information collected by the one or more sensors and package the status information to node messages for the microcontroller to pass to the wireless message transceiver to broadcast during the at least one selected time slot assigned to the vehicle and to process messages received by the wireless message transceiver from all other nodes in the neighborhood in time slots not assigned to the vehicle.

According to one feature of this aspect of the invention, the device further includes a GPS (Global Positioning System) module, the GPS module including the wireless signal receiver, wherein the external time reference signal is time signal provided by a GPS satellite and the consecutive timing markers are the 1PPS (one-pulse-per-second) pulse edge of the GPS time signal, and the GPS module being coupled to the microcontroller and the application message processor to provide location and speed information of the vehicle to the application message processor for inclusion in the status information of the vehicle. The messages broadcast by the wireless transceiver include the location and speed information of the vehicle provided by the GPS module. As a further feature, the device further includes an accelerometer, said accelerometer being configured to measure acceleration of the vehicle and providing said acceleration data to the application message processor for inclusion in the status information. The messages broadcast by the wireless transceiver include the acceleration data. Additionally, the device may include a data storage device stored thereon GPS map data. The application message processor is further configured to compute a predicted trajectory of movement of the vehicle, and to generate an internal safety message from the location and speed information, the acceleration data and the projected trajectory of the vehicle and of other nodes. If the safety message generated by the application message processor indicates imminent danger, the communication device generates a warning message.

In other aspects the invention provides various combinations and subsets of the aspects described above.

BRIEF DESCRIPTION OF DRAWINGS

For the purposes of description, but not of limitation, the foregoing and other aspects of the invention are explained in greater detail with reference to the accompanying drawings, in which.

DETAILED DESCRIPTION OF EMBODIMENTS

Figure 1:
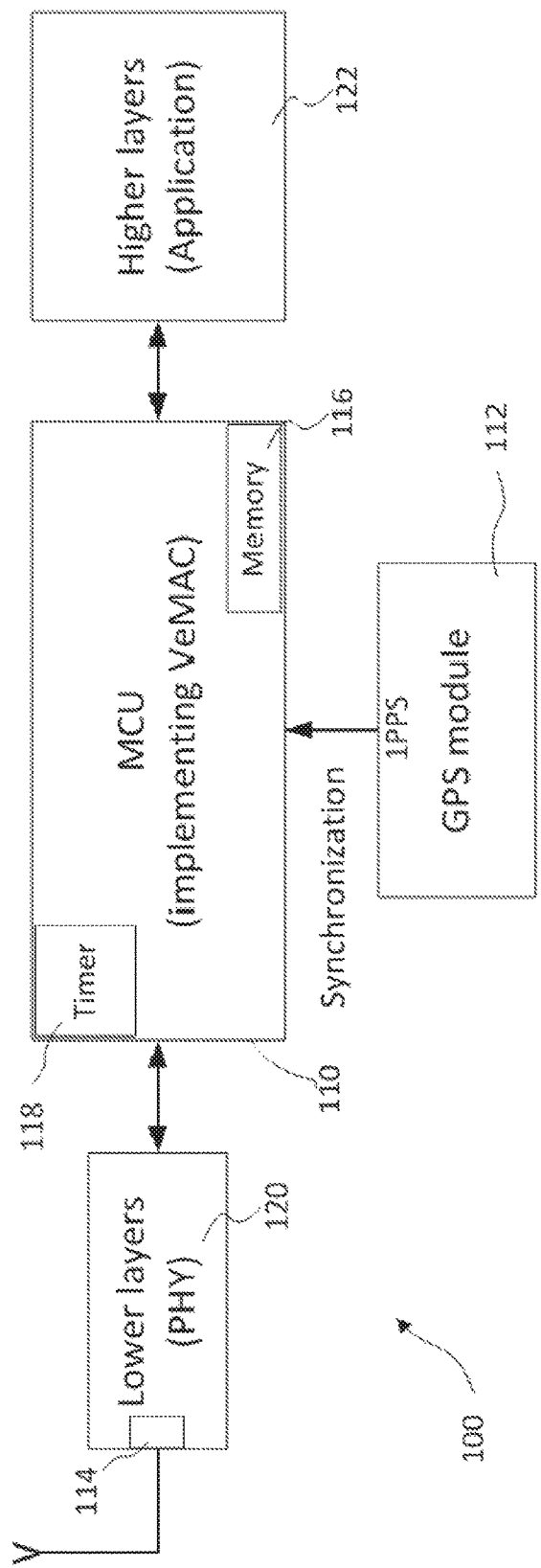
FIG. 1 is a block diagram that illustrates the general configuration of a communication device for establishing and maintaining vehicular communications.

The description which follows and the embodiments described therein are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

The invention is directed to a system, method and apparatus related to vehicular communications. In the description from here onward, "vehicle" shall mean a moving object, whether self-propelled or driven by another self-propelled moving object, and may include road vehicles such as automobiles, buses, transportation trucks, trailers or other heavy good vehicles, railroad vehicles such as trains or individual cars of a train, aerial vehicles such as passenger airplanes, helicopters, unmanned aerial vehicles (UAVs), or ships, boats, underwater vehicles such as submarines, among others. The term "vehicular communications" includes both vehicle-to-vehicle communications ("V2V communications") and communications between and among vehicles and road-side-units ("RSU") ("V2R communications"). The vehicular communications are wireless, which may be by way of radio signals, infra-red signals, microwave signals, optical or ultra-violet signals, sound signals, among others. In one implementation, radio spectrum in the 5.9 GHz band allocated for Dedicated Short Range Communications ("DSRC") is employed.

FIG. 1 is a diagram that illustrates in a block diagram the general configuration of a communication device 100 for establishing and maintaining vehicular communications that implements the method described herein. The device 100 has a microcontroller 110, a timing signal receiver 112 and a wireless signal transceiver 114. The timing signal receiver 112 is interfaced with and providing external time synchronization signals to the microcontroller 110. The wireless signal transceiver receives and transmits wireless communication signals over the vehicular communication network to communicate with surrounding nodes (vehicles and RSUs), as directed by the microcontroller 110.

The microcontroller 110 may be any microcontroller that is configurable, i.e., programmable. The microcontroller 110 may be configured with instructions, i.e., a series of programmed steps or functions. The instructions may be stored on a memory device 116 of the microcontroller 110. When the instructions are executed by the microcontroller, it will cause the programmed functions to be performed. For example, the microcontroller 110 may execute instructions to implement the VeMAC protocol.

Microcontroller 110 has both timer and external interrupt capabilities, i.e., is both timer interruptible and externally interruptible. It may be interrupted when clock counts of an internal clock or timer 118 reaches a threshold value. It may also be interrupted, for example, by a rising edge of timing signals received from the timing signal receiver 112. When interrupted, the microcontroller 110 executes an interrupt service routine ("ISR") attached to the respective interrupt.

The microcontroller 110 includes an internal clock or timer 118. Based on the microcontroller's clock frequency, the internal clock or timer 118 keeps accumulated number of clock count using a clock counter, to measure time lapsed from the start of the clock counter. As will be appreciated, lapsed time determined in this fashion will have inaccuracies due to manufacturing inconsistencies associated with each microcontroller or inaccuracies caused by variations in operation environment. Nevertheless, for each individual microcontroller (or its timer), such inaccuracy tends to be consistent. For example, if the clock of a particular microcontroller (or timer) is fast (i.e., inaccurate) by 0.001%, then it tends to be always fast by 0.001% under the same conditions. It will be appreciated that although conveniently, the clock or timer is internal, i.e., built into the microcontroller 110, the timer 118 also may be external to the microcontroller 110 where required or desirable.

The timing signal receiver 112 may be a radio wave signal receiver, a sound wave signal receiver, a microwave signal receiver, or any wireless signal receiver that is suitable for receiving the wireless signal for providing the external timing reference. The timing signal receiver 112 receives an external time reference signal and provides successive timing markers contained in the external time reference signal to the microcontroller 110 for time synchronization, here time synchronization among nodes in vehicular communication, as will be described in great detail below. As also will be described in detail below, the external time reference signal also can be used by the microcontroller to correct time errors in internal clock or timer 118 caused by its inaccuracies.

In order to synchronize nodes in the vehicular network, one first provides or chooses an external time reference signal source that is common to all of these nodes. The external time reference signal provides a common time reference from time to time, such as at one second intervals or some other regular (or irregular) time intervals. The time reference may be provided as timing markers in the time reference signal, or may be in some other manners that identify the current time to all nodes receiving the time reference signal. The time reference signal may be provided from a single source (such as a single satellite) or a network of synchronized sources (such as an array of transmission towers or satellites). Conveniently, Global Positioning System (GPS) signals provide such an external time reference signal, with its one-pulse-per-second ("1PPS") signal as the required timing marker. The timing signal receiver 112 thus may be a GPS receiver (as indicated in FIG. 1) that receives GPS signals as the external time reference signal. In the following, the 1PPS markers of GPS signals will be used as an example to illustrate the external time reference signal, though it should be understood that any external wireless signal that may be received by all nodes in vehicular communications may be used as the external time reference signal.

Synchronization based on external timing references will provide synchronization only at times when the timing markers or other timing signals are received by the nodes. At other times, each node will be required to provide its own timing signals. Conveniently, each node may be equipped with a microcontroller, whose internal clock may be used for such purpose. However, it will be appreciated that an internal clock may have timing errors. For example, a microcontroller will have manufacturing inconsistencies, which lead to timing errors. Second, the microcontroller itself may age over time, which may cause inaccuracies of its clock operation. Third, variation in operation environment conditions of a microcontroller, such as battery voltage, ambient temperature etc, may also cause the clock frequency to drift. Thus, it will be necessary to compensate for these inaccuracies of the internal clock. In order to compensate, one first calibrate the individual microcontroller by comparing its internal clock against a time reference signal. For example, one measures the number of clock counters between two (or a few) timing markers, such as between two successive 1PPS markers of a GPS signal, to calibrate the internal clock.

In addition to microcontroller 110, timing signal receiver 112 and wireless signal transceiver 114 of device 100, device 100 may also include a physical layer (PHY) processor 120 (or physical layer message module). The physical layer processor 120 is interfaced with the wireless signal transceiver 114 and the microcontroller 110 for processing messages, such as status messages or safety messages. The status messages (or state information messages) and safety messages (both periodically broadcast safety messages and even-driven safety messages) may be that of other nodes and received from wireless signal transceiver 114 from other nodes. The status and safety messages also may be that generated by the node's on-board unit or units, which are subsequently processed by physical layer processor 120 and packaged into suitable format for transmission by the wireless signal transceiver 114.

The physical layer processor 120 is mainly responsible for processing physical layer tasks, such as channel coding, carrier modulation, pulse shaping, power amplification, signal filtering, and multiple-input-multiple-output (MIMO) functionalities. For example, physical layer processor 120 may package a safety message (received from microcontroller 110) into a suitable format according to the communication protocol adopted by the transceiver 114 and forward the packaged safety message to the transceiver 114 for broadcasting.

Figure 2A:
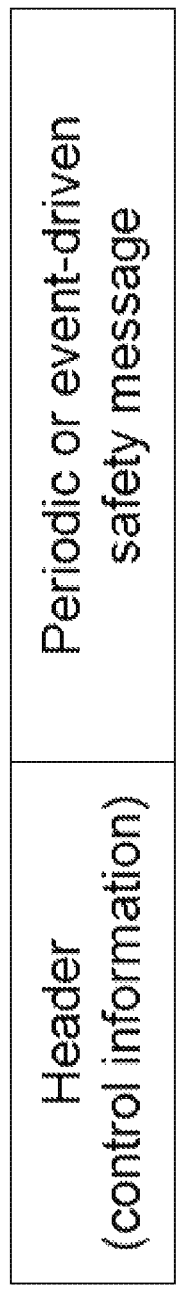
FIG. 2A illustrates a data format for a broadcast packet.

FIG. 2A illustrates the format of such a communication message, or broadcast packet. Each communication message is partitioned into a leading header portion for storing control information, such as the information necessary for collision detection and time slot acquisition for the VeMAC protocol, and a body or payload data portion for transporting data exchanged between the communicating nodes, such as periodic or event-driven safety messages. The control information in the packet header field usually contains standard fields (i.e., fields that exist in the packet format of the majority of MAC protocols), such as the transmitting node MAC address and the intended receiving node MAC address (or broadcast address), as well as other specific information fields, which depend on the type of the employed MAC protocol. For a VeMAC packet, in addition to the standard fields in the packet header, it is desirable to include time slot assignment information such as the vector N constructed by the transmitting node (which indicates the time slot assignment in the node's one-hop neighborhood), as will be described later in further detail. A VeMAC packet that includes such time slot assignment information such as vector N may be conveniently referred to as TYPE1 packet and a VeMAC packet that does not include such information may be conveniently referred to as a TYPE2 packet.

Device 100 also may include an application message processor 122. The application message processor 122 may have its own microprocessor and memory storage device. Thus, upon executing instructions stored on its memory storage device, the microprocessor of the application message processor is caused to perform the functions of the application message processor 122 described herein. For example, the application message processor 122 may cause its microprocessor to execute instructions, to display a warning message. The warning message may be based on a safety message received by the wireless signal transceiver 114. Instructions associated with application message processor 122 may also be stored on the memory device 116. Of course, as will be understood, the application message processor may also share with the physical layer processor the same microcontroller 110. When provided with its own microprocessor, application message processor 122 is interfaced with microcontroller 110, either directly or through other processors, and may be used for, e.g., performing information security, network layer operations, or transport layer functionalities.

An application message processor 122 (optionally having its own microcontroller) is generally referred to as higher layer processor because it is mainly responsible for processing higher level tasks. The application message processor 122 may package the vehicle's state information received from various on-board sensors, such as accelerometer, thermometer, and GPS module, into a safety message for the microcontroller 110 to broadcast, by passing the message to the physical layer (or lower layer) processor, to broadcast the vehicle state information, such as acceleration, temperature, location, dimensions, and speed. When GPS signal is used for providing timing reference, other information, such as location and speed information can be extracted from GPS signal. Together with GPS map data, the predicted trajectory of movement of the vehicle may be calculated from such information, which may be calculated using any known method. This predicted trajectory information can be used, together with location and speed information of the vehicle and surrounding vehicles, to predict imminent danger, such as a potential collision. An internal safety message may be generated to alert the operator of the vehicle of this danger. For example, upon receiving a particular safety message, whether such an internal safety message or a similar safety message from a nearby vehicle, the application message processor 122 may execute functional steps to display or generate a warning audible alert to the vehicle's operator, to alert the operator of the danger of a stalled vehicle in a segment of curved road ahead of the vehicle, and may generate or display information message such as distance to the stalled vehicle and the approaching speed.

To enable establishment and maintenance of V2V or V2R vehicular communications, it is important that none of the two nodes within the communication range of each other, or with communication ranges both reaching at least another common node, should be allowed to transmit at the same time. It is therefore helpful to define a neighborhood, within which all nodes are within direct communication range or within direct communication range with at least one common node, also within this neighborhood. This neighborhood may be defined with reference to a "two-hop set", or THS for short. A THS is a set of nodes in which each node can reach any other node in two hops at most, wherein a node is said to reach another node in one "hop" if the two nodes are within the direct communication range of each other, i.e., can directly communicate. Such a THS conveniently provides a two-hop neighborhood of a local node.

Thus, to enable establishment and maintenance of V2V or V2R vehicular communications, all nodes within communication range will need to be time synchronized, so that the nodes can agree on the time division scheme, i.e., dividing time into indexed time slots and assigning different nodes to different indexed time for the purpose of transmission of messages. Time synchronization enables the nodes to transmit and receive messages in their respective assigned time slots.

Figure 2B:
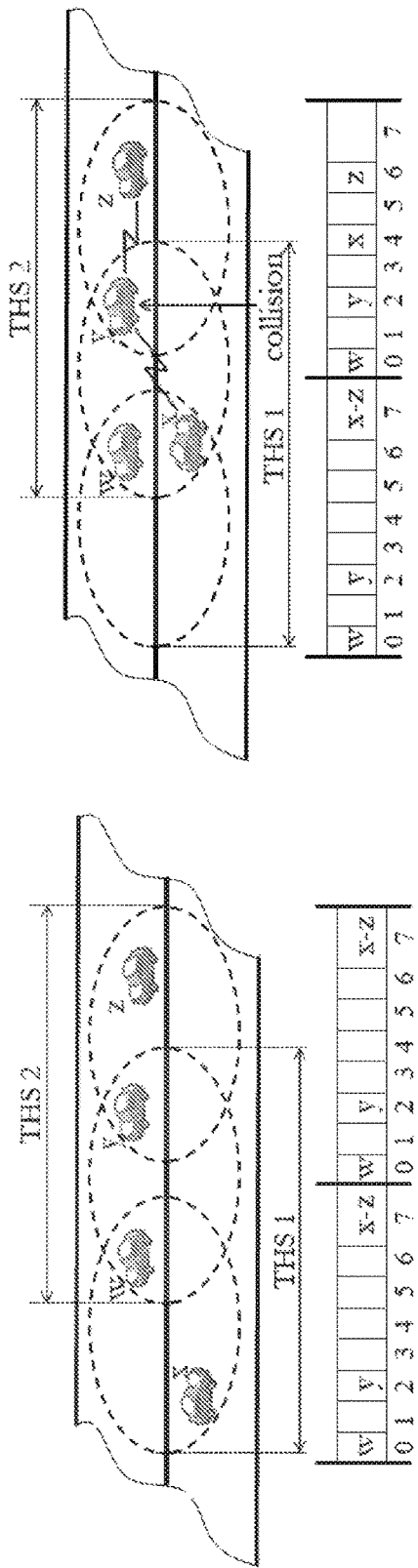
FIG. 2B illustrates a node neighborhood and transmission collision due to mobility of nodes.

FIG. 2B(a) shows a typical node configuration where a group of nodes is surrounded by an ellipse if and only if any two nodes in the group are within the communication range of each other. Nodes x, y, and w are assigned different time slots because they are all members of the same first THS neighborhood, THS1. On the other hand, vehicles x and z are allowed accessing the same time slot in a frame, because they are not within communication range with each other and therefore they do not belong to the same THS. However, when vehicle x moves to the second THS neighborhood, THS2, as shown in FIG. 2B(b), the transmission of the safety messages from vehicles x and z in the first frame will collide at vehicle y. In this case, each of vehicles x and z detects the transmission collision and acquires another available time slot in the second frame. The transmission collision detection by vehicles x and z is achieved via the control information broadcast by vehicle y over its acquired time slot in the second frame.

Time synchronization among the nodes may be conveniently achieved by synchronization of the first time slot of each frame among all nodes in a THS neighborhood. Furthermore, after several frames, nodes may be re-synchronized utilizing the external timing signal, such as a GPS signal, only at the first time slot of the first frame. In particular, the start, or rising edge, of each GPS second may be such a suitable signal. Conveniently, most GPS receiver provides such a 1PPS (one-pulse-per-second) signal that may be used as timing markers of a time reference signal.

Figure 2C:
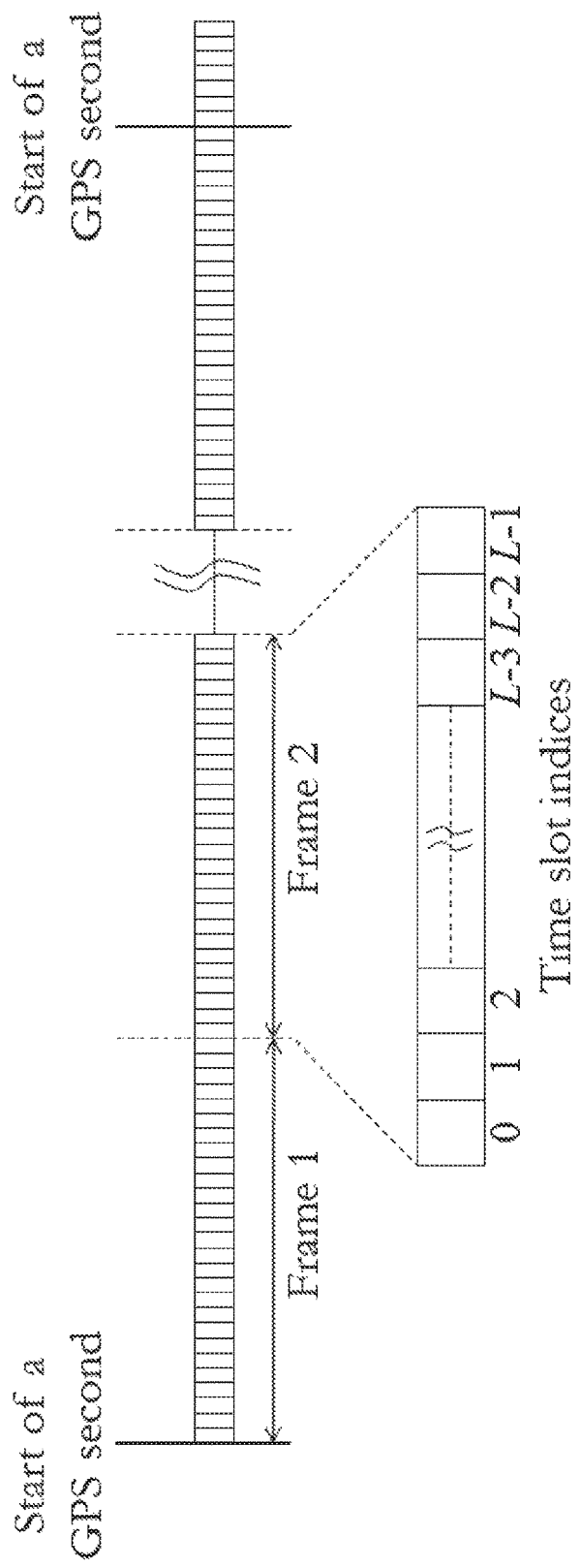
FIG. 2C illustrates a time partition and synchronization scheme according to a MAC protocol described herein.

In the following, VeMAC will be used in examples as a MAC protocol for establishing and maintaining vehicular communications between nodes within communication range, though it will be understood that other MAC protocols may also be employed. According to VeMAC, each node transmits signals to all other nodes within the communication range of the node, but only and always in its assigned time slots. According to a particular time division scheme, slots are grouped into frames. Each node must be assigned at least one time slot in a frame. Therefore, signals from a node can be transmitted in the assigned time slot(s) during each frame. Or, if viewed in another way, the time partition or division scheme partitions a periodic time duration into frames and each frame is further divided into indexed time slots. In the following it will assume that there will be an integer number of frames during each second (or each GPS second as determined by consecutive 1PPS signals in a GPS signal) and each frame always has a constant integer number of time slots, with all time slots having the same fixed time duration. This time partition and synchronization scheme, suitable for VeMAC, is illustrated in FIG. 2C.

But it will be understood that this particular time partitioning scheme is not necessary, as long as each node can agree on the beginning and end of each indexed time slot and the frame. Further, the communication protocol also may be any other protocol that is based on dividing time periods into multiple time slots, which may or may not have fixed time duration. Nevertheless, for ease of illustration, this time partition scheme will be assumed in the descriptions that follow.

Figure 3:
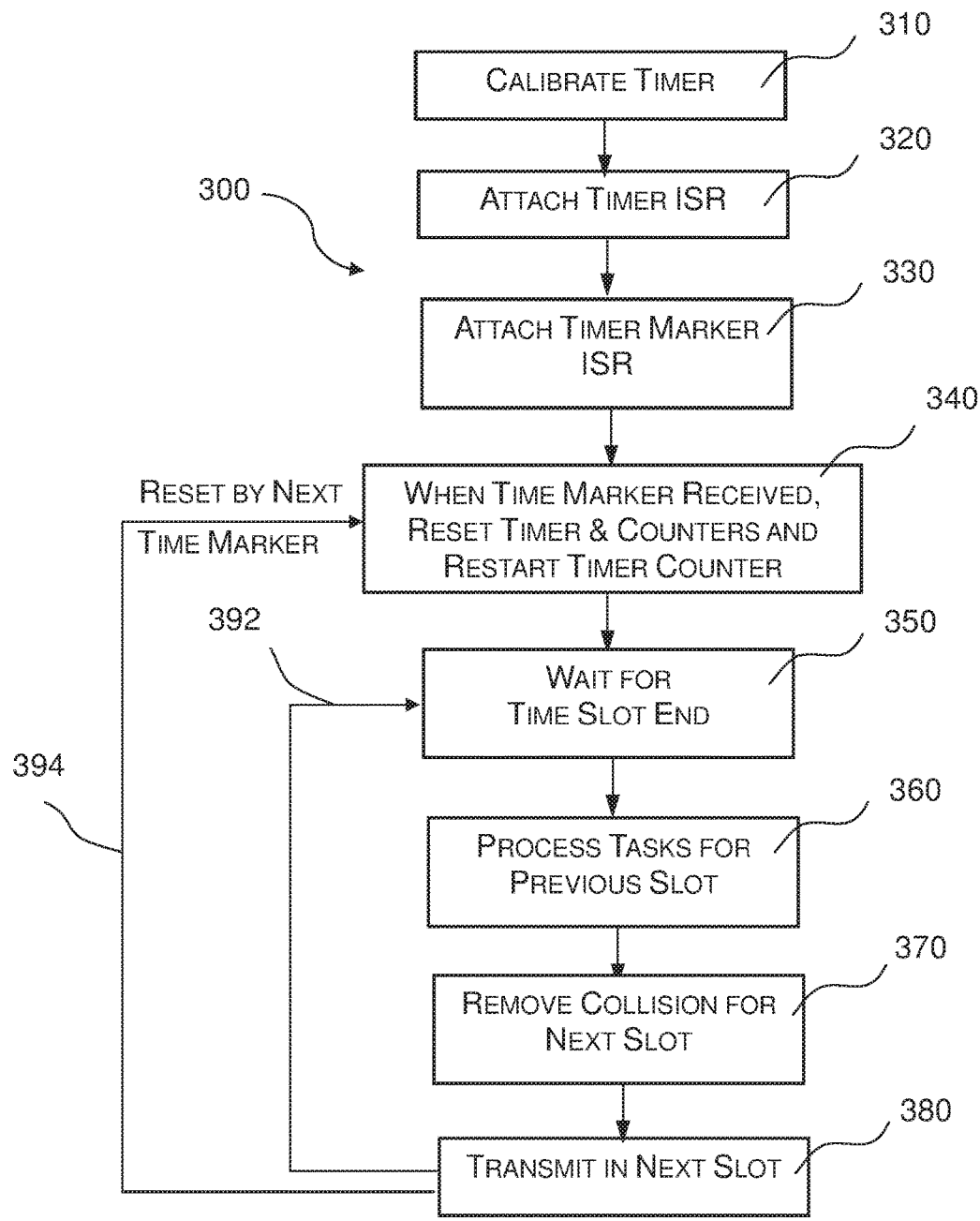
FIG. 3 shows steps of a method for time synchronization and establishing and maintaining vehicular communications.

Referring to FIG. 3, there is illustrated a communication method that is useful for time synchronization and for establishing and maintaining communication in a VANET. The method uses a microcontroller 110, which has an internal clock or timer 118, and a reference timing signal receiver 112, such as a GPS receiver, for synchronization. The synchronization method calibrates and compensates for inaccuracy (e.g., due to manufacturing errors or inconsistencies) in the nominal value of clock frequency of the microcontroller (MCU) or timer used at a certain node.

The method includes three main procedures: initialization, slot-synchronization setup, and MAC protocol operations, here VeMAC operations. The microcontroller is configured, i.e., programmed, to implement the method, i.e., to execute these three procedures in that sequence. In the initialization procedure, all the global variables and constants are declared and initialized, and all the functions and interrupt service routines (ISRs) required for the other two procedures are defined. In the slot-synchronization setup procedure, ISRs are attached to the microcontroller and their required variables are initialized. In the MAC protocol operation procedure, time slot synchronization and time slots assignment are performed, with synchronization errors corrected, transmission collisions detected, and messages transmitted, received and processed.

Now, referring to FIG. 3, the first step is to calibrate the timer 118 (step 310). The calibration is to correct any time inaccuracies that are inherent of timer 118 in comparison to the external timing signal, here the GPS signal. As will be appreciated, here one assumes that the GPS signal (or any external time reference signal) provides accurate timing information and any discrepancy between the timing information provided by the GPS signal and that provided by timer 118 is due to inaccuracies of timer 118. This needs not to be the case. Timer 118 may be actually more accurate than GPS signal when compared with a third, standard timing signal. Nevertheless, any discrepancy between timer's timing signal and GPS signal's timing signal will be deemed to be due to inaccuracy on the part of the timer, not the GPS signals. Therefore, the compensation may also be more accurately described as correcting discrepancies between the timing signal of the timer (or the microcontroller) and the timing signal provided by timing markers by the external time reference signal, rather than compensating the inaccuracies or correcting errors of the timer (or the microcontroller). Nevertheless, for ease of description, this compensation will be treated as compensating the inaccuracies or correcting errors of the timer (or the microcontroller).

To calibrate, the first step is to calculate an average synchronization error introduced by the MCU timer. Here, synchronization error refers to the absolute difference between a time duration calculated by MCU, e.g., time duration elapsed between the arrival of two successive timing markers of the external time reference signal (e.g., between the arrival of two successive rising edges of the GPS 1 PPS signal), and the actual time elapsed between the arrival of the same two successive time markers based on the external timing reference standard (e.g., GPS time standard or clock). Referring to the GPS 1PPS signal as a timing marker, the average synchronization error (per GPS second) can be determined by summing the synchronization errors over a duration of several MCU seconds (or SYNC_SEC seconds) and then dividing the summation by SYNC_SEC. Hence, by dividing this average synchronization error per second by the total number of time slots per second, NUM_SLOT_SEC, the average error in the slot duration calculated by the MCU based on its internal clock (as compared to the actual slot duration based on the external time reference) can be obtained. This average error in the slot duration is then used to adjust the actual duration required for a time slot, SLOT_DUR defined for the MCU.

Figure 3A:
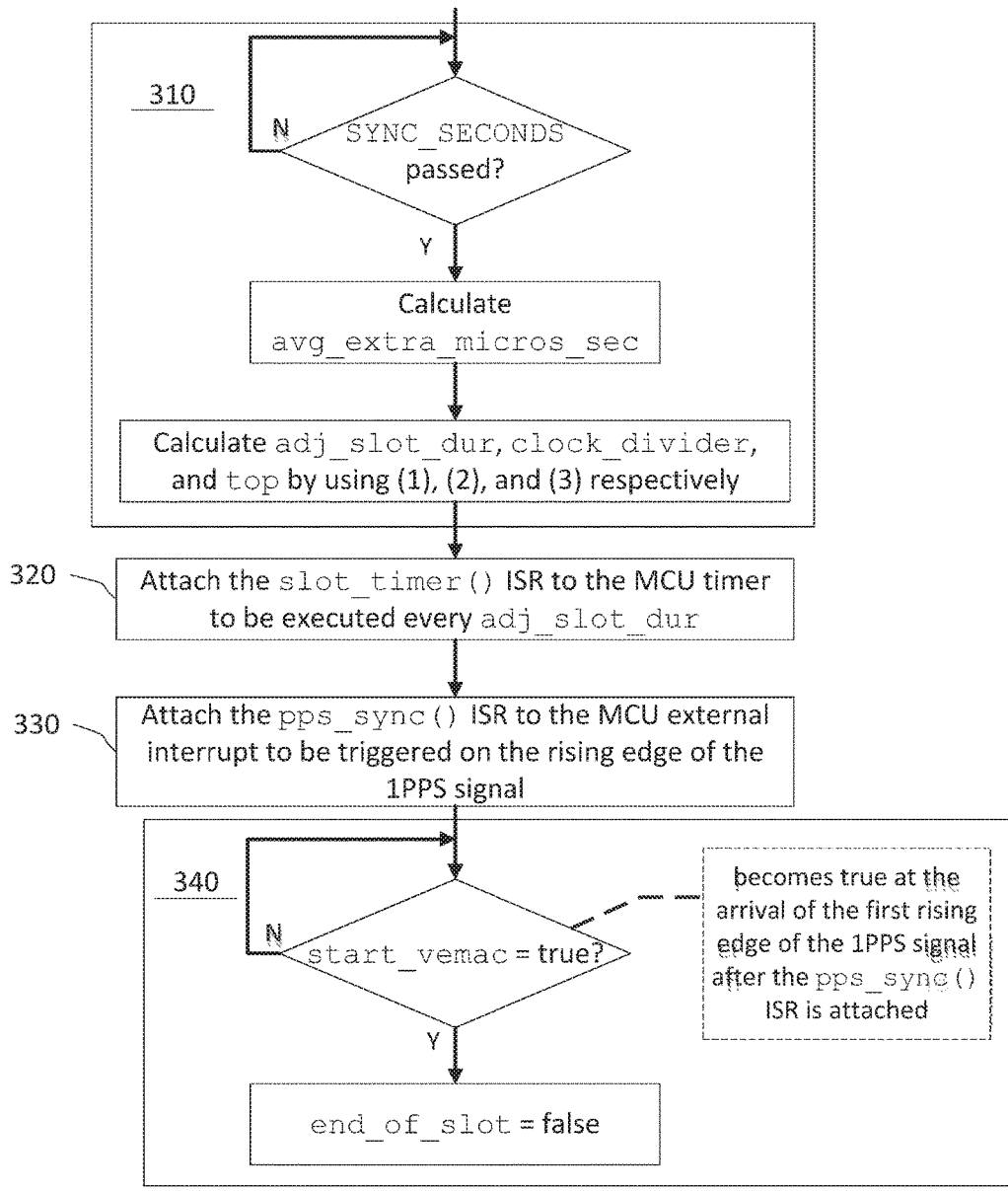
FIG. 3A is a flowchart illustrating some implementation detail of steps shown in FIG. 3.

FIG. 3A illustrates certain implementation details of steps 310-330 according to a particular detailed implementation. The average synchronization error per second is first calculated over a duration of several seconds (or SYNC_SEC seconds), and stored in a variable called avg_extra_time_sec. The value of avg_extra_time_sec is positive (negative) when the MCU timer counts faster (slower) than the speed required for a perfect synchronization with the 1PPS signal; and the absolute value of avg_extra_time_sec depends mainly on the manufacturing error in the nominal value of the MCU clock frequency. Given the value of avg_extra_time_sec, the SLOT_DUR value is adjusted to compensate for the average synchronization error, i.e., $$\text{adj\_slot\_dur} = \text{SLOT\_DUR} + \frac{\text{avg\_extra\_time\_sec}}{\text{NUM\_SLOT\_SEC}}. \quad (1)$$

In this way, if the MCU timer is faster (slower) than required, SLOT_DUR defined for the MCU is increased (decreased) by the amount of $$\left| \frac{\text{avg\_extra\_time\_sec}}{\text{NUM\_SLOT\_SEC}} \right|,$$

which compensates for the average extra (less) time that the MCU timer calculates per second as a result of the manufacturing error in the MCU clock frequency.

During the slot-synchronization setup procedure, a timer ISR, slot_timer( ), is first attached (step 320) and then an external timing signal ISR, pps_sync( ), is attached (step 330), in order to perform slot-synchronization during the VeMAC operation. The slot_timer( ) ISR is attached to the MCU timer to periodically indicate the end of a time slot, with a period equal to the adj_slot_dur value. Since the adj_slot_dur value is calculated in (1) to compensate for the average synchronization error per second, there likely exists a residual synchronization error calculated by the MCU at the arrival of each rising edge of the 1PPS signal. Provided that the residual synchronization error is much smaller than the adj_slot_dur value, and given that each GPS second contains an integer (fixed) number of frames, it tends to be true that each rising edge of the 1PPS signal arrives either slightly before the end of the last time slot in the last frame of a second, or slightly after the start of the first time slot in the first frame of a second. In both cases, any residual synchronization error can be eliminated in the pps_sync( ) ISR by restarting the MCU timer and (for the former case only) indicating the end of the current time slot. The steps of attaching these two ISRs and synchronizing time slots in a time frame are illustrated in more detail in FIG. 3A.

Figure 3B:
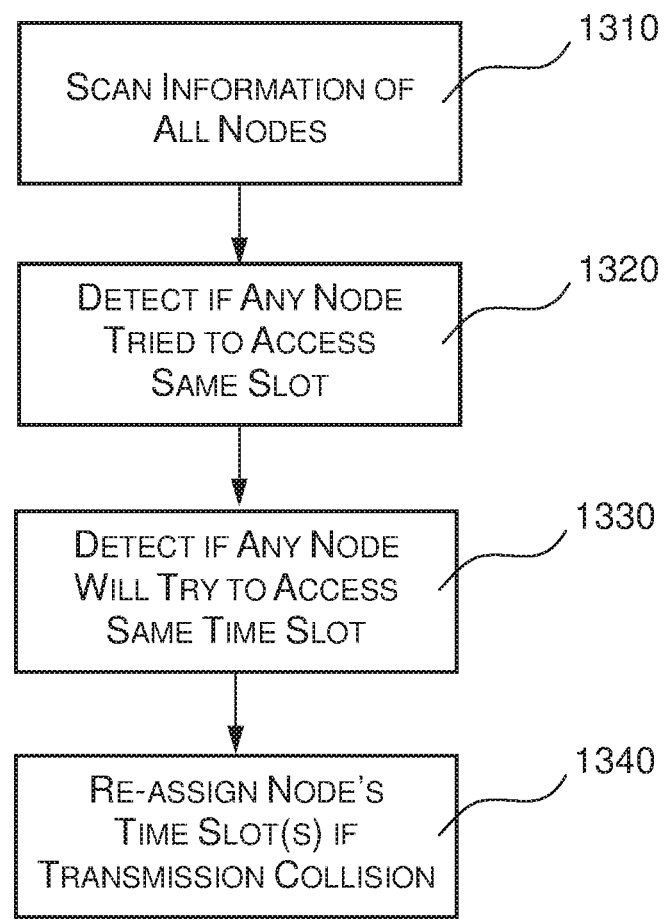
FIG. 3B is a flowchart illustrating steps performed to avoid transmission collision.

FIG. 3B illustrates in flowchart form further details of steps performed by pps_sync( ) ISR to perform slot-synchronization during the VeMAC operation procedure. In FIG. 3B, slot_sec is a timer counter used by pps_sync( ) ISR to keep track of the total number of time slots accumulated by the MCU since arrival of the most recent timing marker. This is the most recent 1PPS signal, i.e., the beginning of the GPS second, when the GPS signal is used as external time reference. The variable end_of_slot is a Boolean variable used by pps_sync( ) ISR to indicate the end of the current time slot and start_vemac is a Boolean variable used by pps_sync( ) ISR to indicate the start of the VeMAC operation procedure. Steps illustrated in FIG. 3A and FIG. 3B will next be further described in detail.

Referring to FIG. 3 and FIG. 3A, after the two ISRs are attached, the VeMAC operation procedure starts at the arrival time of the first rising edge of the 1PPS signal, i.e., when the next time marker is received (step 340). At this step, timer and timer counter are reset and the next time counter (or time cycle) is restarted.

The end of each time slot can be identified by the value of the clock counter. Each time slot will end, i.e., the microcontroller will be interrupted and will perform certain tasks associated with slot end, when the value of the clock counter reaches the corresponding value of the adjusted value of the slot duration, adj_slot_dur (step 350). Thus, the beginning of next time slot, which is the same as the end of the current time slot, is marked by clock counter reaching a value corresponding to adj_slot_dur. Conveniently or alternatively, one may also set a counter that counts up to half of this value and then count down to zero to determine the end of the time slot.

As noted, microcontroller will wait for the end of the time slot (step 350) and when the time slot end is reached, the microcontroller 110 will perform certain tasks programmed by the attached ISR. First, the microcontroller 110 is configured to process any tasks or messages at step 360 related to the current time slot (also referred prev_slot when viewed from a time after the end of the current time slot). Next, the microcontroller 110 is configured to scan transmission and receiving records related to the current time slot (also designated as prev_slot) to detect for a transmission collision condition, i.e., to determine if any transmission collision happened in any previous time slot that the node has accessed or would happen during a future time slot that the node is planning to access. Upon detecting such a collision condition, reassign time slot(s), i.e. deselect the time slot(s) and re-select different time slot(s) to avoid transmission collision (step 370). Of course, the reselected time slots should be the one not selected by other nodes, i.e., unoccupied slots.

Referring to FIG. 3B, this is done by first defining a neighborhood of the node, i.e., a set of nodes that the subject node can reach in a specified number of hops. One such neighborhood may be a THS neighborhood. Transmission information of nodes in this neighborhood can be obtained from the control information that each node includes in the broadcast packets, as shown in FIG. 2A.

To support VeMAC protocol, each node transmits, or broadcasts, this time slot assignment information in the control information part of a broadcast packet. This time slot assignment information may be stored in a vector N, elements of which contain VeMAC IDs of one-hop neighbors from which packets were received in the previous FRAME_LEN time slots (where FRAME_LEN is the number of time slots per frame according to a VeMAC protocol). More particularly, this vector N may have its element i set to x, where x is the VeMAC ID of a one-hop neighbor that accessed time slot i, or have its element i set to 0, to indicate that the node did not receive packet during time slot i. Thus, information of time slots used by all other nodes in a one-hop neighborhood can be constructed by each node using control information received from all other nodes in the one-hop neighborhood. From this, one can also construct a quantity to hold information about the time slots used by all the nodes in a two-hop neighborhood. Toward this end, one may conveniently construct a matrix U, a two-dimensional array of dimension FRAME_LEN×FRAME_LEN, which contains the one-hop neighborhood information received by the node from its one-hop neighbors in the last FRAME_LEN time slots. The k-th column of U thus represents the vector N received by the node from a one-hop neighbor on time slot k. If at a certain time slot the node did not receive any packet, the corresponding column is set to all zeros. The vector N and matrix U are updated by each node at the end of each time slot.

FIG. 3B illustrates a method of detecting and avoiding transmission collision, which may be carried out at step 370. The transmission information of all nodes in the neighborhood is scanned (step 1310) to determine if any other nodes tried to access the same time slot assigned to the current node. If this happened, there is a transmission collision (step 1320). Transmission information about other nodes is also scanned to determine if for the next time slot during which the current node will be transmitting, whether any other nodes would access the same time slot assigned to the current node. If that is the case, there also will be transmission collision (step 1330). When past or future transmission collision is detected, i.e., if the current node used or would use a time slot or time slots used by other nodes, time slot(s) for the current node where transmission collision happened or would happen will be reassigned (step 1340), to remove any transmission collision. The time slot may be reassigned to another available slot, such as the next available time slot. A time slot is available if it is not assigned to any node in the neighborhood, such as a THS neighborhood. The node may be assigned to a randomly selected slot that is available. Apart from randomly selecting an available time slot, any other desirable selection mechanism may be used. This time slot selection will then be included in the control information (as an entry in the current node's N vector) when the current node next broadcasts a TYPE 1 packet, so that all other nodes in the neighborhood will have its timeslot assignment information.

Referring back to FIG. 3, after avoiding all transmission collisions (detected in the past and expected in the future), if the next time slot is among the time slots assigned to the node, the microcontroller will cause the wireless signal transceiver 114 to transmit any messages, if any is or are waiting to be transmitted, in the next time slot (step 380). After having performed these tasks, the microcontroller will return (step 392) to step 350 to wait for the end of the next time slot before the next time marker arrives (e.g., before the current GPS second ends). When the current GPS second ends, for example, indicated by the arrival of the next 1PPS signal, the microcontroller 110 will return to the beginning of this loop (step 394) and reset the timer and timer counter (step 340) to start a new time cycle (or GPS second). The details of steps performed at the arrival of a timing marker are further illustrated in FIG. 3C.

Figure 3C:
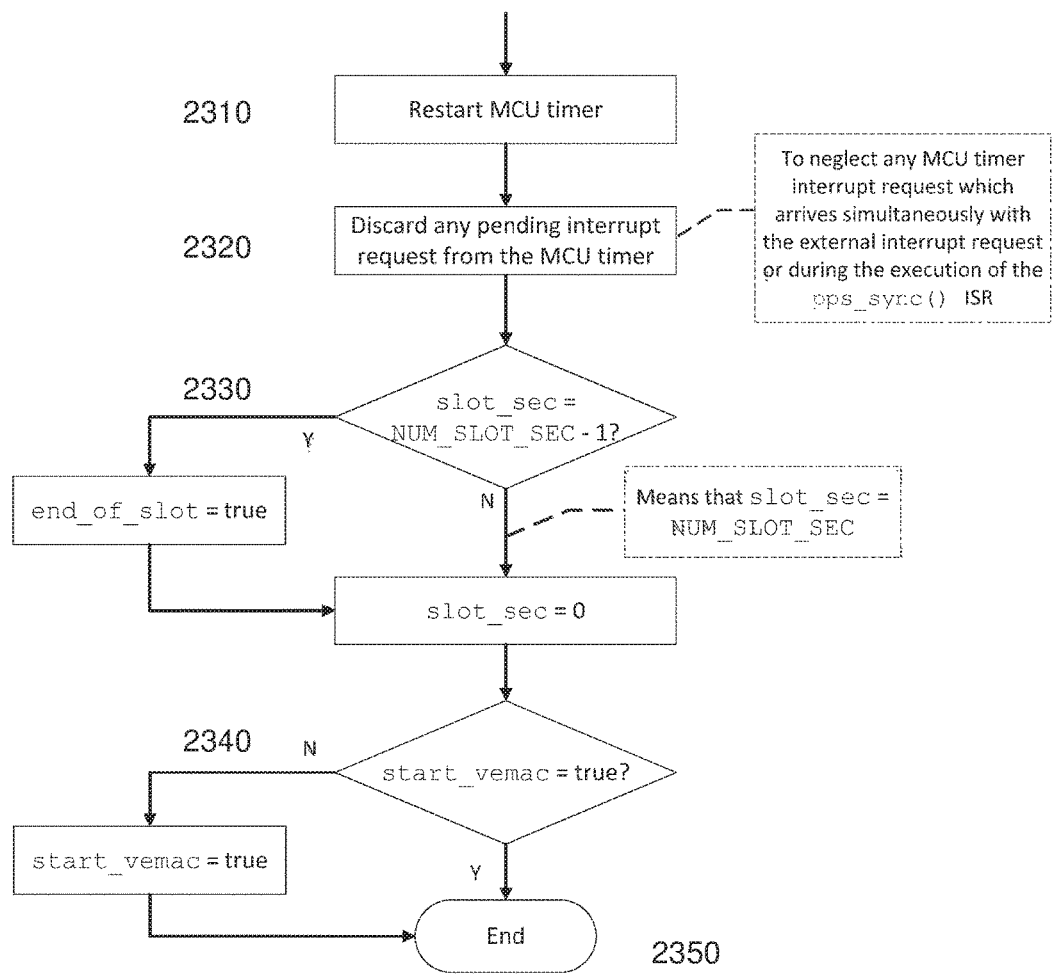
FIG. 3C is a flowchart illustrating some implementation details of steps for synchronizing time slots.

Referring to FIG. 3C, at the arrival of a timing marker, the microcontroller restarts a new time cycle. It first restarts its timer, or MCU timer 118 (step 2310). Next, it discards any pending interrupt request from the MCU timer 118 (step 2320), in other words, any MCU timer interrupt requests which arrive simultaneously with the external interrupt request or during the execution of the pps_sync( ) ISR. Next, the microcontroller checks if the timing marker has arrived during the last time slot of the last frame in a second (i.e., when slot_sec=NUM_SLOT_SEC−1), as determined based on the microcontroller timer. In this case, the microcontroller indicates an early end of the current time slot by setting end_of_slot=True, which is equivalent to intentionally ending step 350 after the microcontroller executes the pps_sync( ) ISR, in order to perform the tasks associated with the end of the current time slot (i.e., steps 360-380) and start the first time slot of the first frame in a second (i.e., the next time slot) aligned with the timing marker. On the other hand, if slot_sec≠NUM_SLOT_SEC−1, the timing marker is considered to have arrived during the first time slot of the first frame in a second, as determined based on the microcontroller timer. In this case, the restart of the MCU timer (step 2310) is sufficient to align the first time slot of the first frame in a second (i.e., the current time slot) with the timing marker, and the microcontroller does not need to change the end_of_slot variable (i.e., does not intentionally terminate the current time slot). Once the end is reached (step 2330), a variable start_vemac, indicating the start of the VeMAC procedure, is set to true (step 2340). Setting the start_vemac variable to true is to inform other functions of the original start of the VeMAC procedure, and to align the original start of the VeMAC procedure with the arrival of the timing marker, i.e., with the start of the first time slot of the first frame is a second (steps 2350 and 340).

Referring to FIG. 4, FIGS. 5A-5F, FIG. 6A and FIG. 6B, this is further explained with further details in reference to a detailed implementation. At the end of a time slot (step 410), the microcontroller is configured to process any tasks or messages related to the current time slot (also referred prev_slot). These tasks include, with reference to FIG. 4:

Step 420: read any safety message received in that time slot from the PHY layer and store it in the memory device, and subsequently pass the received safety message to the application message processor 122; the application message processor 122, according to the safety message received, will execute a series of steps, such as to display a warning message, to generate an alarm, or to execute a control maneuver operation of the vehicle.

Step 430: detect deadlock condition and re-assign time slots for the node to use in the future. The "deadlock problem" is a term that is used to indicate an undesired time slot assignment, in which more than one node within the same communication range are accessing each of the used time slots, which results in a continuous transmission collision of all the broadcast safety messages. For example, all nodes may be selecting the same time slot or same set of time slots for broadcasting. As a result, all nodes are transmitting during the occupied time slots, so that none of the node, or some of the nodes, are receiving any message during a frame. One technique to detect this condition is to check whether a node failed to successfully receive a packet from any neighbor node for a time duration longer than a specified threshold. When such a deadlock condition is detected, all time slots assigned to the node are released and other time slots are assigned to this node, so that it will be listening i.e., receiving messages, during some of these released slots when other nodes are broadcasting.

Figure 4:
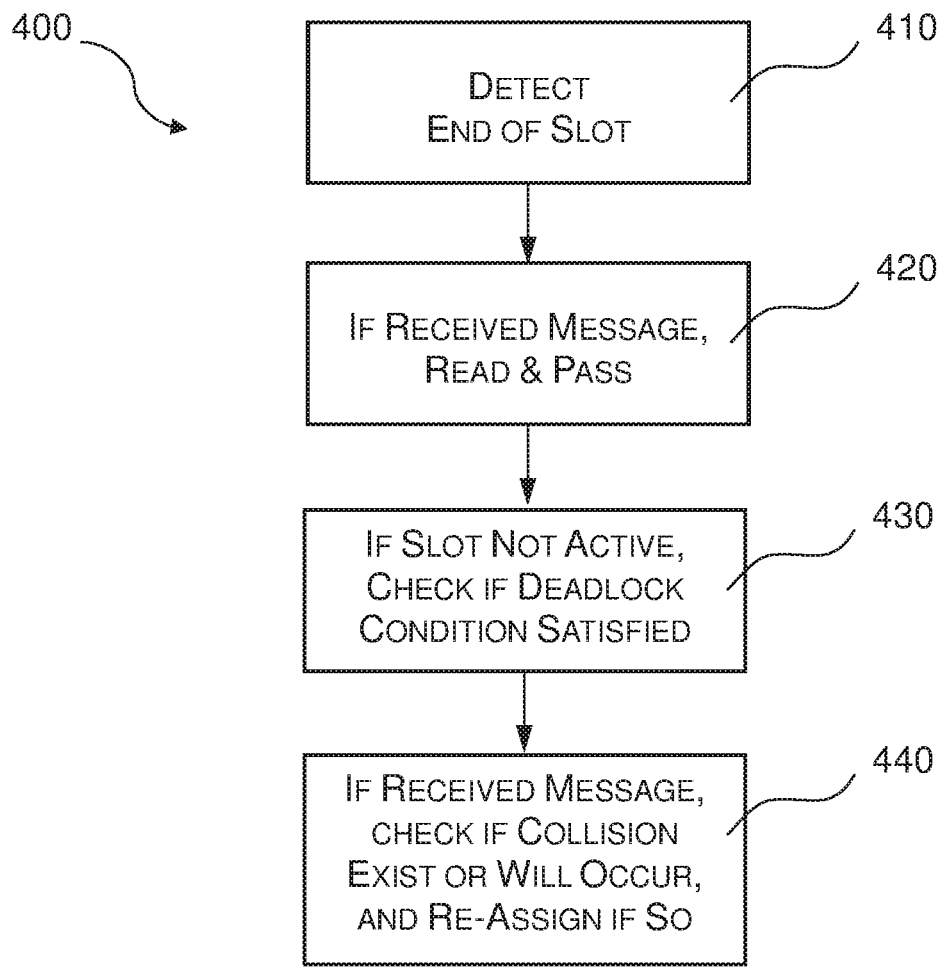
FIG. 4 illustrates steps performed at the end of a time slot by the communication device shown in FIG. 1.

Step 440: detect transmission collision condition if the time slot was used to receive a packet, and re-assign a time slot if transmission collision occurred on a time slot that the node has accessed, or expected to occur on a time slot that the node is planning to access in the future (but has not accessed yet). Transmission collision condition occurs if one or more other nodes used the same time slot for transmission. The information of slots assigned to all the nodes in the one-hop neighborhood, i.e., the nodes from which the subject node has received packets in the previous FRAME_LEN slots (where FRAME_LEN indicates the number of time slots per frame), is transmitted in the control message portion of a message at least once in each frame (see FIG. 3). This information may be stored in vector N and matrix U as described in connection with the data format illustrated in FIG. 2A. Using this information, if any time slot assigned to other node or nodes is identical to one of the time slots that the node has accessed in the previous FRAME_LEN slots or planning to access in the future, the node is assigned a different time slot for future communication, i.e., for the next and subsequent time frames. In assigning the node a different time slot for future use, care is taken that the assigned time slot is always selected from time slots that are available to this node, namely time slots that are not used by (i.e., assigned to) any other nodes in its neighborhood, such as in its two-hop neighborhood, according to slot assignment information received by this node, such as the slot assignment information stored in vector N and matrix U. This is explained further in reference to FIGS. 5A-5F, FIG. 6A and FIG. 6B. But first, it will be understood that although FIG. 4 shows steps 420, 430 and 440 in a sequential manner, these steps do not need to be performed in any particular order. Further, depending on the time slot transmission conditions detected, some of the slot-reassign steps (to avoid collision or deadlock, for example) may not be performed. For example, it is possible that a time slot was idle and thus no action for transmission collision avoidance would be required.

FIGS. 5A-5F, FIG. 6A and FIG. 6B show in a flowchart form one particular implementation example. According to this particular implementation, at the end of each time slot, two main VeMAC functions are executed by the MCU 110 in sequence: prev_slot_handler( ) and next_slot_handler( ). The operation of the prev_slot_handler( ) function and further details of this function and the other functions that it calls, namely, VeMAC_recv( ), avoid_fut_collision( ), avoid_deadlock( ), detect_collision( ), and update_fut_slot( ) are further respectively illustrated in FIGS. 5A-5F. Details of the next_slot_handler( ) function and the VeMAC_send( ) function that it calls are respectively illustrated in FIG. 6A and FIG. 6B.

A table, namely Table 1, is provided herein to further explain the constants, variables, and ISRs used in these figures, namely FIGS. 5A-5F, FIG. 6A, and FIG. 6B. In Table 1, a value indicated between parentheses below a certain variable represents the initial value of the variable. An initial value indicated between curly braces is to indicate the initial value of all the elements of a vector or an array.

TABLE 1

| List of constants, variables, and ISRs and their brief description | | |
|---|---|---|
| Type | Name | Definition |
| Constants | SLOT_DUR | VeMAC slot duration |
| | SYNC_SECONDS | number of seconds used to calculate the avg_extra_time_sec |
| | MCU_SPEED | nominal frequency of the microcontroller clock |
| | NUM_SLOT_SEC | total number of time slots per second based on the SLOT_DUR value |
| | FRAME_LEN | number of time slots per frame (for synchronization issues, the constants SLOT_DUR and FRAME_LEN should guarantee that each second contains an integer number of frames.) |
| | NO_FUT_SLOT_SCHEDULED | status constant for VeMAC operation (can be set to any negative number) |
| | NO_PREV_SLOT_ACCESSED | status constant for VeMAC operation (can be set to any negative number) |
| | WAIT_AVAILABILITY | status constant for VeMAC operation (can be set to any negative number, different from NO_FUT_SLOT_SCHEDULED) |
| | LISTENING_TO_FRAME | status constant for VeMAC operation (can be set to any non-zero number) |
| | N_SLOTs | The maximum number of time slots per frame that the node is allowed to access. |
| | NODE_ID | a vector of N_SLOTS entries, where NODE_ID[i] indicates the VeMAC ID that the node uses to access its $i^{th}$ time slot (a VeMAC ID of 0 is not allowed) |

TABLE 1-continued

List of constants, variables, and ISRs and their brief description

| Type | Name | | Definition |
|---|---|---|---|
| | DEADLOCK_THRESHOLD | | the number of time slots that if elapsed without receiving any packet, the node releases its time slots and acquire new ones to avoid the deadlock problem |
| Data types | VeMAC_pkt_type | | enumerated data type with elements TYPE1 and TYPE2 |
| | MacState | | enumerated data type with elements MAC_SEND, MAC_IDLE, and MAC_RECV |
| Packet structure | VeMAC_packet | | structure for a VeMAC packet that includes the following elements: |
| | Elements | packet_type | the type of the packet, either TYPE1 or TYPE2 |
| | | Tx_mac_addr | the MAC address of the transmitting node |
| | | Tx_N | the N vector constructed by the transmitting node |
| | | Tx_id | the VeMAC ID used by the transmitting node to access the time slot over which the packet was received |
| Functions | prev_slot_handler( ) | | performs all the necessary VeMAC operations (by calling other functions) based on the status of the MAC layer in the previous time slot, i.e., idle, sending, or receiving. |
| | next_slot_handler( ) | | decides if a VeMAC packet should be transmitted in the next time slot and performs the necessary actions in case a transmission is needed (by calling other functions). |
| | VeMAC_recv( ) | | receives a VeMAC packet from the PHY layer and pass the received safety message (if any) to the application layer. |
| | VeMAC_send(s) | | prepares and passes a VeMAC packet to the PHY layer for transmission in the next time slot. The input parameter s determines the VeMAC ID that will be included in the VeMAC packet. |
| | avoid_fut_collision( ) | | avoids a future collision on a time slot that the node is planning to access (but hasn't accessed yet), when the node receives a packet indicating that the target time slot is no more available. |
| | detect_collision( ) | | updates the relevant variables when the node detects a collision on one of its time slots. |
| | update_fut_slot( ) | | determines which time slot the node should access after a collision detection and accordingly update the relevant variables |
| Variables | adj_slot_dur | | an adjusted VeMAC slot duration which compensates for the average synchronization error per second done by the MCU timer |
| | avg_extra_time_sec | | the average synchronization error that the MCU timer does in the duration of one second |
| | slot_sec | | counter for the number of time slots calculated by the MCU in the last second |
| | start_vemac | | a Boolean variable which indicates the start of the VeMAC operation procedure |
| | end_of_slot | | a Boolean variable which indicates the end of the current time slot |
| | clock_divider | | a variable which stores a prescaler value (i.e., a divider of the MCU_SPEED), which defines the frequency of the clock that is used to increment/decrement the MCU timer. The clock_divider can only take a value from a fixed set of values, e.g., {1, 8, 64, 256}, which depends on the MCU type |
| | top | | a variable used by the MCU timer to determine the number of counts which should be done before a timer interrupt is generated |
| | slot (0) | | the coming slot index |
| | Macstate (MAC_IDLE) | | a MacState variable indicating the status of the MAC layer in the previous time slot. |
| | N {0} | | A vector of FRAME_LEN entries containing the VeMAC IDs of the one-hop neighbours from which packets were received in the previous FRAME_LEN time slots. If a one-hop neighbour is accessing time slot i with VeMAC ID = x, then N[i] = x. If the node did not receive any packet during time slot i, then N[i] = 0. |

TABLE 1-continued

List of constants, variables, and ISRs and their brief description

| Type | Name | Definition |
|---|---|---|
| | neigh_mac_addr {0} | a vector containing the MAC addresses of all one-hop neighbours |
| | U {LISTENING_TO_FRAME} | a two dimensional array of dimension FRAME_LEN × FRAME_LEN, containing the one-hop neighbourhood information received by the node from its one-hop neighbours in the last FRAME_LEN time slots. The k-th column of U represents the N vector received by the node from a one-hop neighbour on time slot k. If at a certain time slot the node did not receive any packet, the corresponding column is set to all zeros. |
| | acc_slot_num {NO_PREV_SLOT_ACCESSED} | a vector consisting of N_SLOTs entries containing the indices of the time slots that the node is successfully accessing or attempted to access. If acc_slot_num(i) = NO_PREV_SLOT_ACCESSED, that means that the node hasn't accessed its $i^{th}$ time slot yet or has detected a collision on its $i^{th}$ slot and didn't attempt to access a new one. |
| | fut_slot_num {NO_FUT_SLOT_SCHEDULED} | a vector consisting of N_SLOTs entries containing the indices of the time slots that the node decides to access in the future when it is attempting to acquire a time slot. If fut_slot_num(i) = NO_FUT_SLOT_SCHEDULED, that means that the node is successfully acquiring its $i^{th}$ time slot or attempted to acquire its $i^{th}$ time slot and hasn't detected a collision yet. |
| | succ_acc {false} | a Boolean vector consisting of N_SLOTs entries indicating whether or not the node successfully acquires its time slots. The entry succ_acc(i) is set to true if the node successfully acquires its $i^{th}$ time slot. |
| | coll {true} | a Boolean vector consisting of N_SLOTs entries indicating whether or not the node has detected collision on its time slots. If coll[i] = true, that means that the node has detected collision on its $i^{th}$ time slot. The coll[i] entry is set to false once the node schedules to access a future time slot. |
| | Rx_packet | a global VeMAC_packet variable to store a received VeMAC packet. |
| | PHY_dataReady (false) | a Boolean variable that is set to true by the physical layer when a packet is received. This variable is automatically set to false when the received packet is read by the MAC layer. |
| | idle_slots | the number of time slots elapsed since the last packet was received |
| ISRs | slot_timer( ) | an ISR attached to the MCU timer to indicate the end of the current slot during the VeMAC operation procedure |
| | pps_sync( ) | an ISR attached to the MCU external interrupt, which is triggered by the rising edge of the 1PPS signal, to maintain the slot-synchronization during the VeMAC operation procedure |

Referring to FIG. 3A, a variable, end_of_slot, is set to true at the end of each time slot by the slot_timer( ) ISR to indicate to other functions that the end of a time slot has been reached. The prev_slot_handler( ) function updates the VeMAC variables based on the status of the MAC layer in the previous time slot, which can be one of idle, sending, or receiving. The prev_slot_handler( ) function causes the microcontroller to:

a) receive a VeMAC packet from the physical (PHY) layer and pass a received safety message to the application layer, b) detect any transmission collision on the time slots that the node has accessed in the previous FRAME_LEN slots, c) determine any possible future collision on the time slots that the node is planning to access (if a received packet indicates that one of these time slots became no more available), d) update the set of time slots that the node is accessing if necessary, e.g., after a transmission collision detection or to avoid a future collision, and e) deal with any potential 'deadlock problem'.

Figure 5A:
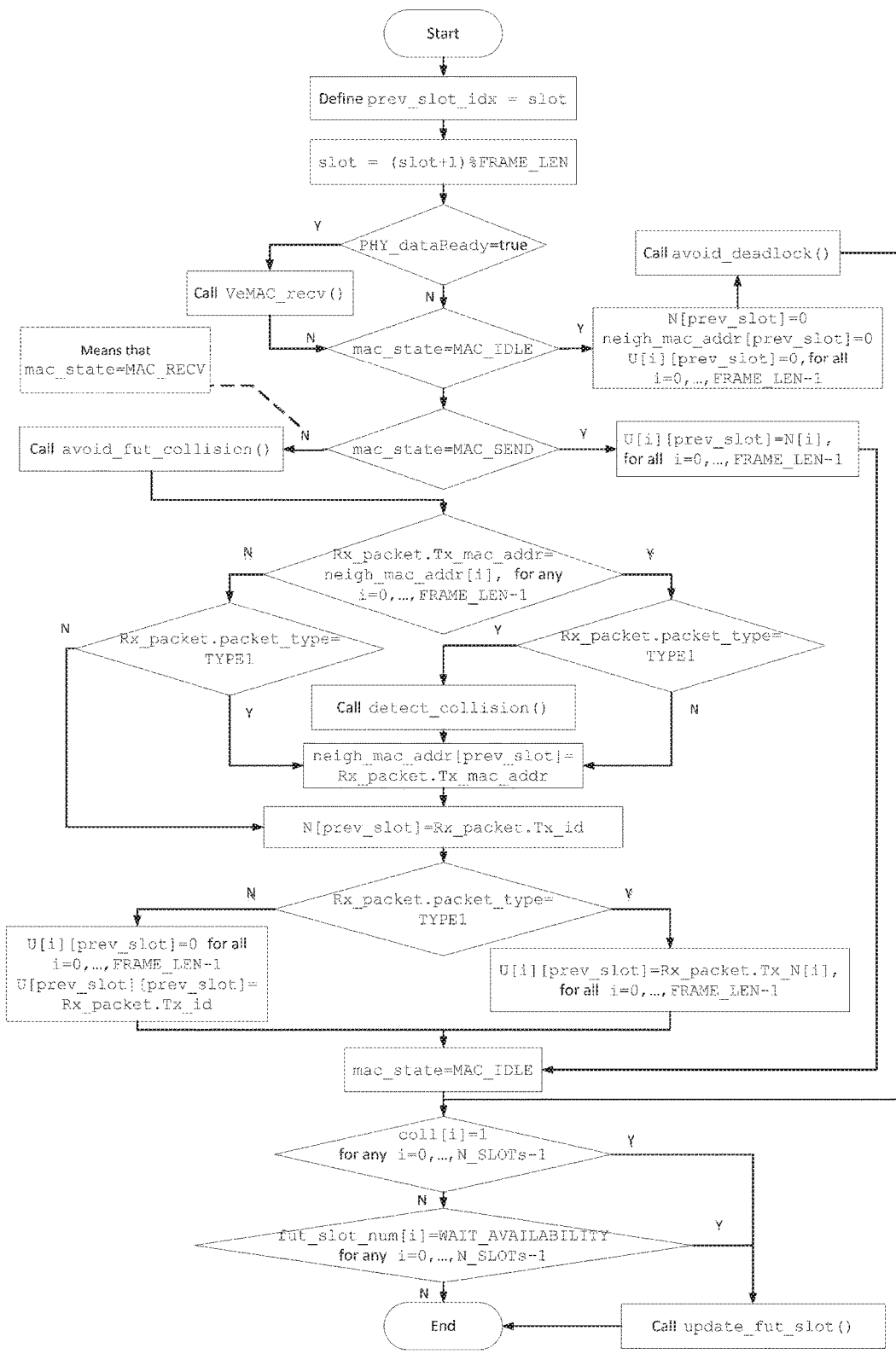
FIG. 5A is a flowchart illustrating implementation detail of steps to be performed at the end of each time slot for slot-synchronization and maintaining node communication.
Figure 5B:
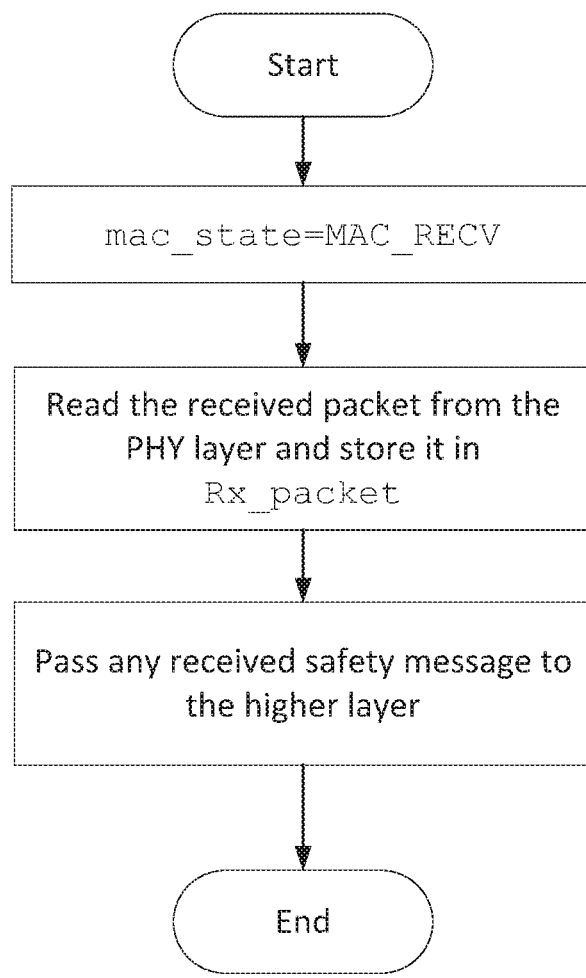
FIGS. 5B, 5C, 5D, 5E and 5F are flowcharts illustrating further implementation details of several steps shown in FIG. 5A.
Figure 5C:
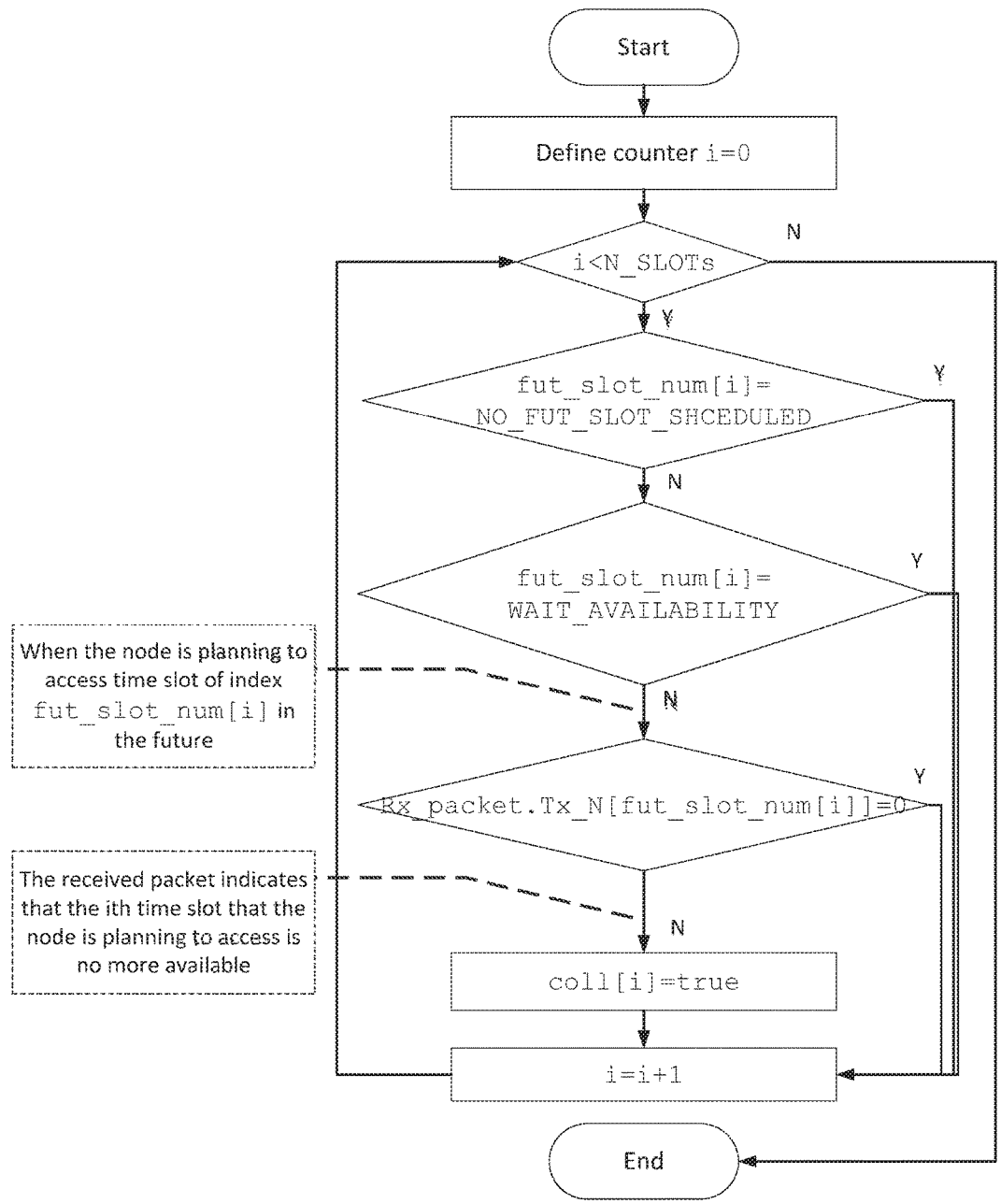
Figure 5D:
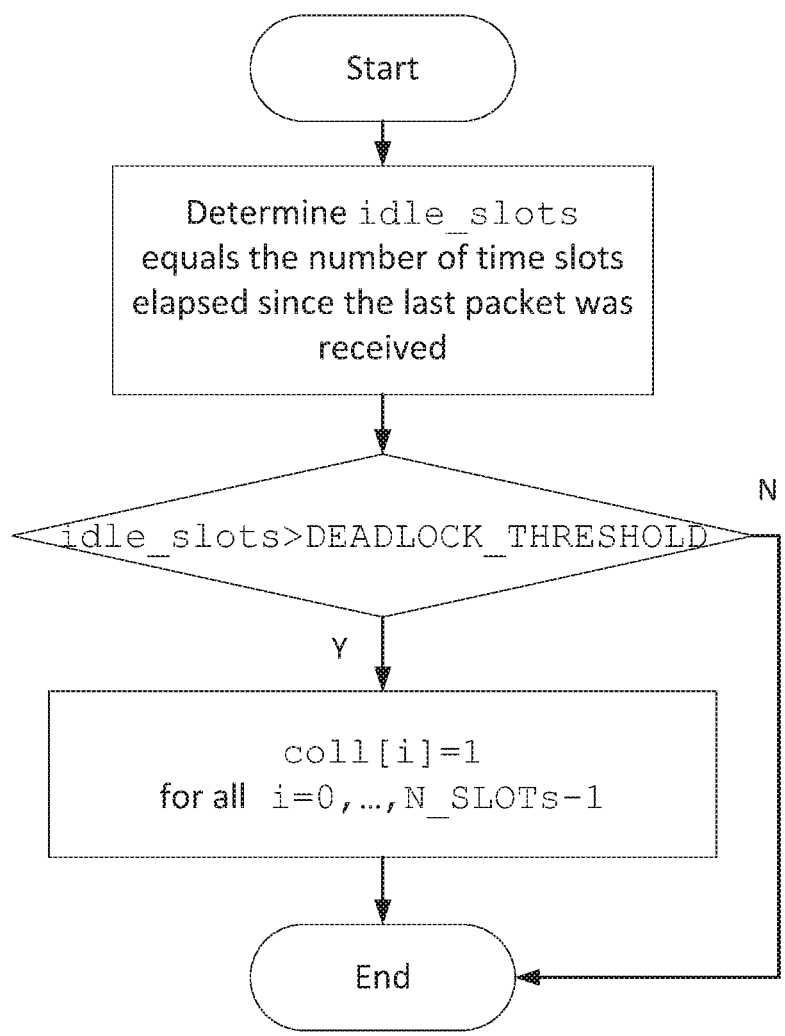
Figure 5E:
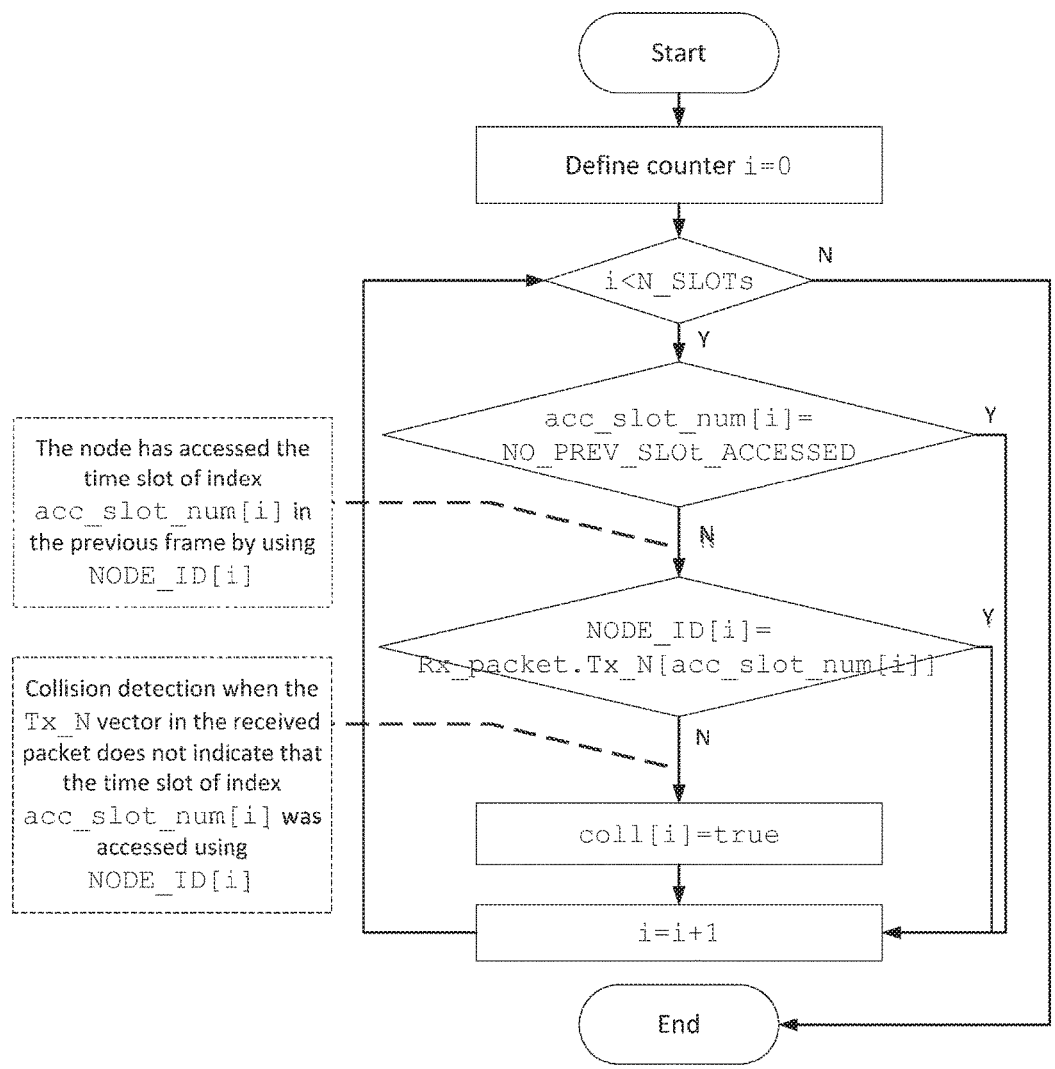

The 'deadlock problem' is a term that is used to indicate an undesired time slot assignment, in which more than one node within the same communication range are accessing each of the used time slots, which results in a continuous transmission collision of all the broadcast safety messages, preventing each of the nodes from detecting any transmission collision by employing the VeMAC collision detection technique. To deal with this problem, the microprocessor 110 determines whether a node failed to receive any packet from any neighbor node for a time duration longer than a specified threshold, a condition referred to as the 'deadlock condition'. If the specified threshold is reached or exceeded (i.e., the deadlock condition is satisfied), the microcontroller assigns different time slot or slots to the node to avoid the deadlock. One approach to detect a potential deadlock problem is to check the deadlock condition during the execution of the prev_slot_handler( ) function. This detection can be achieved, for example, by calling a function avoid_deadlock( ), after each idle time slot determined in the prev_slot_handler( ) function, as shown in FIG. 5A. If the deadlock condition is satisfied, the avoid_deadlock( ) function sets all the entries of the coll vector to true, i.e., intentionally indicates that the node has detected a transmission collision on all its time slots, as shown in FIG. 5D. By introducing this collision detection on all the node's time slots, the node is reassigned new time slots during the execution of the prev_slot_handler( ) function. As shown in FIG. 5A, if any entry of the coll vector is set to true, the function update_fut_slot( ) is called to attempt to assign to the node new time slots among the available ones, i.e., among the time slots not used by any other node in the two-hop neighborhood. Further details of the update_fut_slot( ) function is illustrated in FIG. 5F and further described below.

Figure 5F:
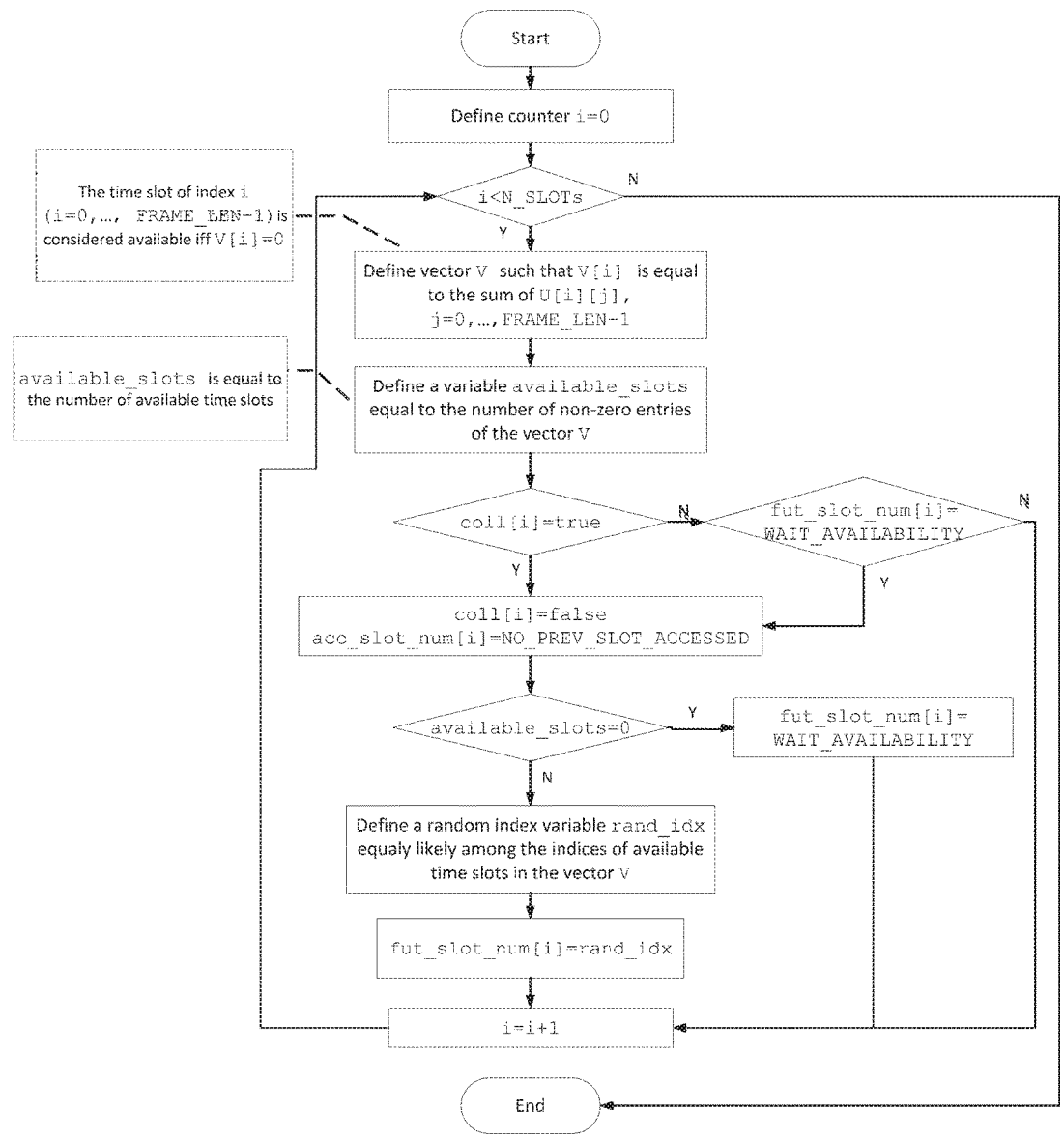

Reference is now made to FIG. 5F. According to this implementation of the update_fut_slot( ) function, if a node is attempting to acquire a time slot, the node schedules to access one of the available time slots 'equally likely'. In case there is no available time slot, the node records that it is 'waiting for availability' to acquire a time slot(s). One way to implement the scheduling of time slot access is by updating the entries of a vector that includes the indices of the time slots that the node is planning to access in the future but has not accessed yet, i.e., the vector fut_slot_num in FIG. 5F. If the node is waiting for availability to acquire a time slot, the corresponding entry in the vector fut_slot_num can be set to a specific number that is out of the range of indices of time slots in a frame.

Figure 6A:
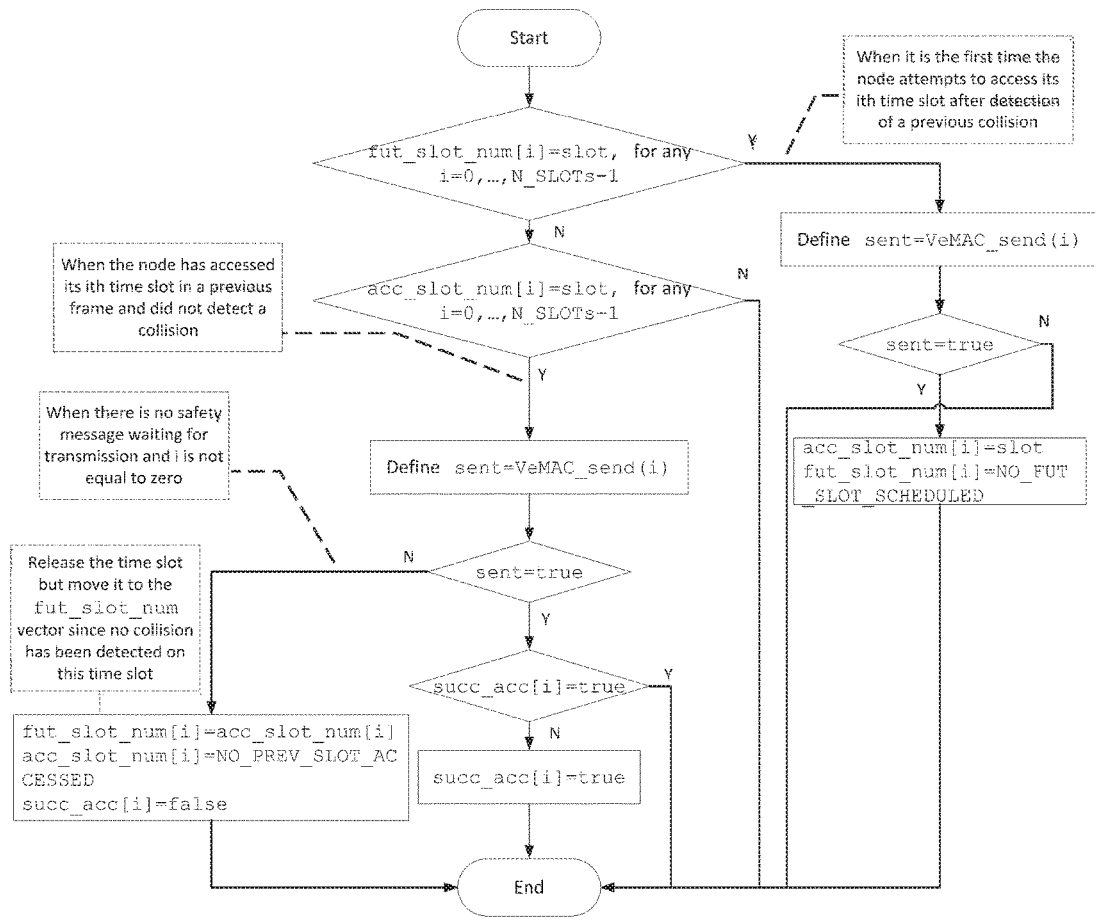
FIG. 6A and FIG. 6B illustrate in flowcharts one example of function steps performed by the communication device shown in FIG. 1 when the end of a time slot is reached.
Figure 6B:
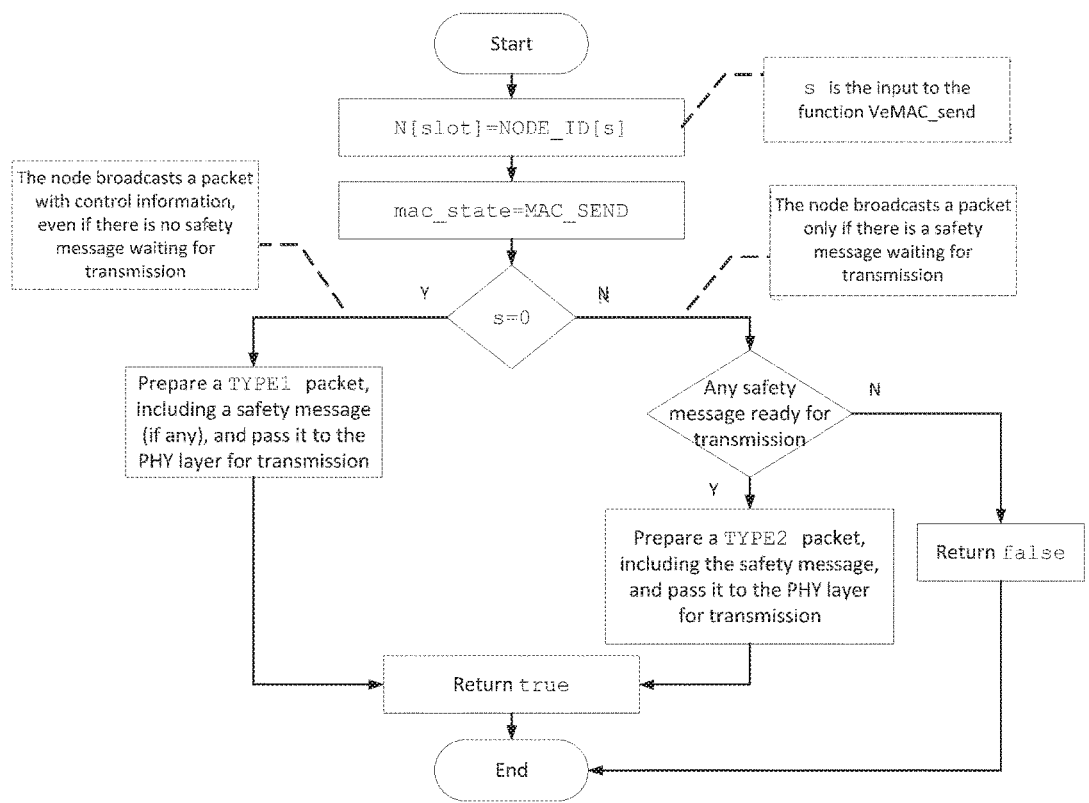

On the other hand, referring to FIG. 6A and FIG. 6B, the next_slot_handler( ) function determines if the next time slot belongs to the set of time slots that the node is currently accessing, and whether or not the application layer has a safety message that is ready for transmission. Accordingly, if the function decides that a VeMAC packet should be transmitted in the next time slot, it constructs the packet and passes it to the PHY layer for transmission. Two types of VeMAC packets are defined: TYPE1 and TYPE2 packets. Each of the two types follows the packet format in FIG. 2A, but the only difference between the two types is in the control information included in the packet header. A TYPE1 packet header includes additional control information (as compared to the TYPE2 header), which indicates the time slots occupied by the one-hop neighborhood of the transmitting node. Each node must transmit a TYPE1 packet once every K frames, where K is a suitably selected integer that is larger than or equal to 1. A larger K value reduces the VeMAC protocol overhead (i.e., the amount of broadcast control information) at the expense of increasing the time required for a node to detect a transmission collision that occurred on one of its time slots. The implementation of the VeMAC_send( ) function in FIG. 6B is specifically for K=1. The control information in the received TYPE1 packet headers provides a receiving node with knowledge of all the time slots occupied in its two-hop neighborhood.

Figure 7:
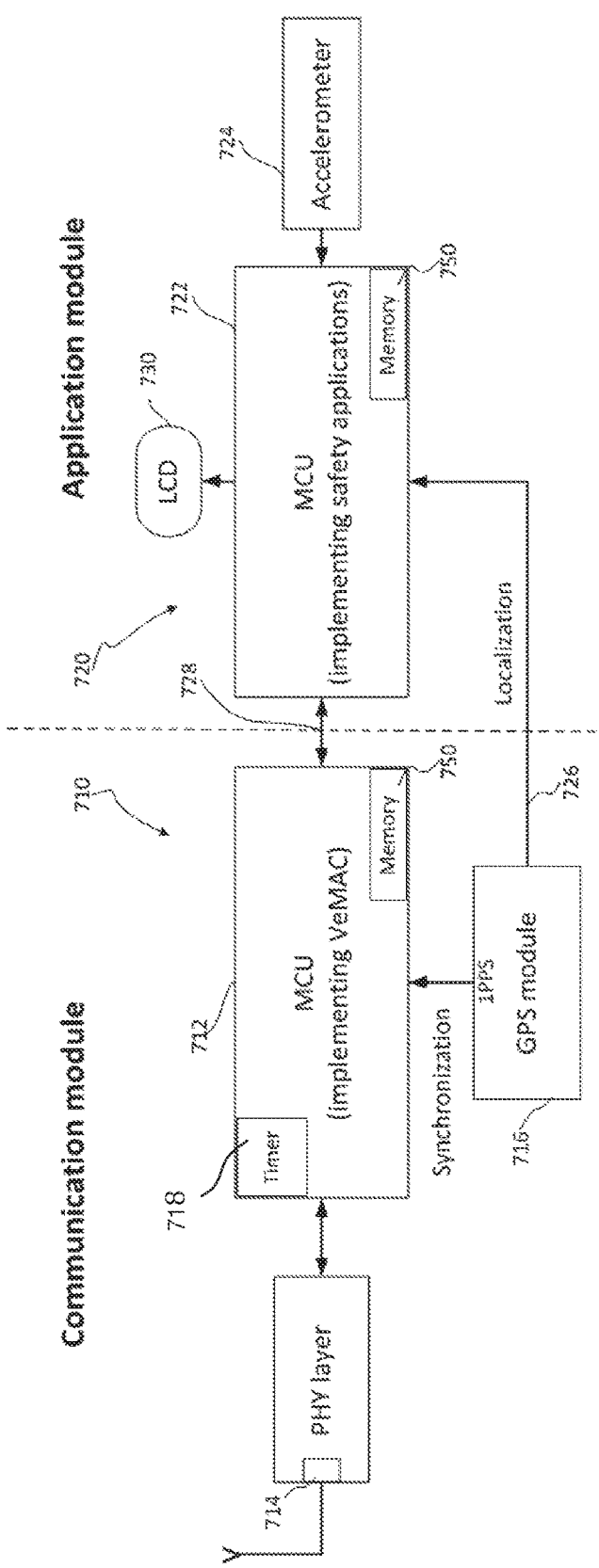
FIG. 7 is a block diagram illustrating an overview of a communication and safety message device.

FIG. 7 provides in block diagram an overview of a communication and safety message device 700, which consists of a communication module 710 and an application module 720. The communication module 710 includes MAC microcontroller 712, based on an ATmega2560 chip. MAC microcontroller 712 implements the VeMAC protocol, as explained in detail above in reference to FIG. 2A to FIG. 6B, interacts with the application module 720, communicates with the wireless transceiver 714 (a Nordic nRF24L01+ chip), and performs slot-synchronization based on the 1PPS signal provided by a GPS module 716 (an EB-365 GPS engine board) and compensated timer signal provided by the microcontroller's internal timer 718, also explained in detail above. On the other hand, the application module 720 consists mainly of another microcontroller, which will be called application MCU 722. Application MCU 722 implements road safety applications, such as collision avoidance and emergency brake alert. It does this by using the communication module 710 to periodically broadcast safety messages including information about the current status of a vehicle once every 100 ms. The status information included in the broadcast safety messages consists mainly of the vehicle location, obtained from the GPS module 716, and its current acceleration/deceleration, determined by an accelerometer 724 (ADXL345) in order to detect any hard brake applied to the vehicle. The device may include a data communication interface, which may include a hardware serial port 726 coupled with the GPS module 716 for forwarding the position information, and a serial peripheral interface (SPI) bus 728 that is used to connect the MCUs 712, 722 in the communication module 710 and application module 720, the wireless transceiver 714, and the accelerometer 724. Of course, direct connections, such as direct connection between GPS module and the MCU also may be implemented. The GPS module may also include a data storage device for storing GPS map data. Thus the application module may use the location, speed, acceleration information and the GPS map data to compute predicted trajectory of movement of the vehicle. When a safety message is received by the communication module 710, based on the implemented safety application, the application module 720 determines whether or not a safety warning is necessary. In case a safety warning is initiated, for example, the vehicle is about to collide with a stalled vehicle, the warning is displayed to the driver on a liquid crystal display 730 (LCD), and an alarming sound is generated by using a digital buzzer. The radio front end is attached to a 5 dBi dipole antenna, and the GPS module 716 is connected to a long-cable GPS antenna which facilitates the indoor experiments. Each of MCUs 712, 722 has a memory storage device 750 for storing instructions thereon, which when executed, will perform the series of steps described above.

In addition to the embodiments and examples described above in detail, according to another example, the devices and the system enable one to implement a method for establishing and maintaining vehicular communications among nodes in a vehicular ad hoc network (VANET) according to a media access control ("MAC") protocol. The MAC protocol divides each of periodic time durations into a plurality of indexed time slots, each of the plurality of indexed time slots having a pre-selected time length, each node of the nodes in the VANET being assigned to at least one indexed time slot of the plurality of indexed time slots. The method comprises the steps of, at each of the nodes in the VANET, receiving a wireless time reference signal for a pre-selected duration from an external time reference signal source, the time reference signal providing consecutive timing markers spaced at a known duration; calibrating a timer of a microcontroller associated with the each node using the consecutive timing markers contained in the time reference signal received over the pre-selected duration; receiving the wireless time reference signal and initiating a time period using one of the consecutive timing markers, during the time period and until receiving a subsequent timing marker: providing end of indexed time slot trigger to the each node for every indexed time slot based on clock count of the timer as calibrated by the microcontroller, assigning the each node to at least one indexed time slot; transmitting one or more messages of the each node in the assigned at least one indexed time slot; and receiving messages from nodes other than the each node in indexed time slots assigned to the nodes other than the each node.

Optionally, the method further includes the steps of detecting a transmission collision wherein multiple nodes transmit messages in a same indexed time slot; and re-assigning each node of the multiple colliding nodes to a different indexed time slot upon detection of the transmission collision.

As another feature, the method further includes the steps of, at each of the nodes, detecting a deadlock condition of the each node during the assigned indexed time slot, and assigning the each node to a different indexed time slot upon detection of the deadlock condition of the each node.

As another example, a communication device may be constructed for establishing and maintaining vehicular communications among nodes in a vehicular ad hoc network (VANET) according to a media access control ("MAC") protocol. The MAC protocol divides each of periodic time durations into a plurality of indexed time slots, each of the plurality of indexed time slots having a pre-selected time length, each node of the nodes in the VANET being assigned to an indexed time slot of the plurality of indexed time slots. The communication device comprises a wireless signal receiver for receiving a wireless time reference signal from an external time reference signal source; a microcontroller coupled to the wireless signal receiver, the microcontroller having a timer, the wireless signal receiver being coupled to the microcontroller and providing the timing markers to the microcontroller, the microcontroller being configured to calibrate the timer using the consecutive timing markers of the time reference signal received from the wireless signal receiver and to assign an indexed time slot to the each node; a wireless message transceiver, the wireless message transceiver being controlled by the microcontroller to receive and send messages; and an application message processor coupled to the microcontroller, the application message processor processing state information of the each node and package the state information to node messages for the microcontroller to pass to the wireless message transceiver to broadcast during an indexed time slot assigned to the each node and to process messages received by the wireless message transceiver from nodes other than the each node in indexed time slots other than the assigned time slots.

Various embodiments of the invention have now been described in detail. Those skilled in the art will appreciate that numerous modifications, adaptations and variations may be made to the embodiments without departing from the scope of the invention, which is defined by the appended claims. The scope of the claims should be given the broadest interpretation consistent with the description as a whole and not to be limited to these embodiments set forth in the examples or detailed description thereof.

What is claimed is:

1. A method of establishing and maintaining vehicular communications among nodes in a vehicular ad hoc network (VANET) established according to a media access control ("MAC") protocol, said MAC protocol having a time division scheme dividing a periodic time duration into a plurality of indexed time slots, said method comprising, local at each node of the nodes in a two-hop neighborhood of the VANET:

receiving at the local node a wireless time reference signal from an external time reference signal source, said time reference signal providing consecutive timing markers separated by a reference time duration;

measuring clock discrepancy between an on-board clock counter of the local node and an external reference clock using the consecutive timing markers contained in the external time reference signal;

upon receiving a timing marker,
synchronizing, at the local node, a pre-selected time slot of the time division scheme to the received timing marker, calculating clock discrepancy per time slot by dividing the clock discrepancy accumulated in the reference time duration by number of indexed time slots in the reference time duration, and adjusting time length of each indexed time slots in the reference time duration by the calculated clock discrepancy per time slot to compensate for the clock discrepancy, and selecting at least one indexed time slots of the time division scheme for message broadcasting at the local node;

during the periodic time duration and until receiving a subsequent timing marker at the local node,
verifying that the at least one selected time slot is not selected by any other nodes in the neighborhood of the local node and, if any one of the at least one selected time slot is occupied by any other node, deselecting the occupied time slot and selecting a different time slot to assign to the local node;

transmitting one or more messages of the local node in the at least one selected time slot, said one or more messages including node identification and time slot selection information of the local node's one-hop neighborhood; and receiving messages from all other nodes in the neighborhood in indexed time slots not assigned to the local node.

2. The method of claim 1, further comprising, at each of the nodes:
detecting a deadlock condition of the local node, and
upon detection of the deadlock condition, deselecting all of the at least one selected time slot assigned to the local node and, for each of the at least deselected time slot, selecting a different time slot not selected by the any other nodes and the local node.

3. The method of claim 1, further comprising, at each of the nodes:
measuring elapsed time of a pre-selected time duration using the on-board clock counter,
measuring elapsed reference time of a multiple of reference time durations that is nominally equal to the pre-selected time duration using the timing markers, and
calculating the time discrepancy from the difference between the elapsed time and the elapsed reference time.

4. The method of claim 1, wherein the time division scheme partitions the periodic time duration into a first integer number of time frames and divides each of the time frames into a second integer number of time slots, and wherein the first time slot of the first time frame is synchronized to the received timing marker.

5. The method of claim 4, further comprising, at each of the nodes,
at least in one of the time frames, identifying from the messages received from all other nodes a set of unoccupied time slots consisting of time slots not selected by any of the nodes,
wherein the at least one indexed time slot selected for message broadcasting is selected from the set of unoccupied time slots.

6. The method of claim 1, wherein said external time reference signal is time signal provided by a GPS (Global Positioning System) satellite in its GPS signal and the consecutive timing markers are the 1PPS (one-pulse-per-second) pulse edge of the GPS time signal.

7. The method of claim 6, further comprising, at each of the nodes:
extracting location information and speed information from the GPS signal,
including the location and speed information of the local node in the one or more messages of the local node for broadcasting, and
broadcasting the location and speed information in the at least one selected time slot.

8. The method of claim 7, further comprising, at each of the nodes:
producing status information of the node by including the location and speed information and the acceleration information in status information of the local node,
calculating a predicted trajectory of movement of the local node, and
generating an internal safety message from the location and speed information, the acceleration information and the projected trajectory of all nodes.

9. The method of claim 8, further comprising:
generating a warning message if the internal safety message predicts imminent danger, and
communicating the warning message to an operator of the local node.

10. The method of claim 1, further comprising, at each of the nodes,
measuring acceleration of the local node using an on-board accelerometer,
including the acceleration data in the one or more messages of the local node for broadcasting, and
broadcasting the acceleration data in the at least one selected time slot.

11. The method of claim 1, wherein the time slots have a pre-selected time length.

12. A vehicle configured to establish and maintain vehicular communications with and among nodes in a vehicular ad hoc network (VANET) established according to a media access control ("MAC") protocol, said MAC protocol having a time division scheme dividing a periodic time duration into a plurality of indexed time slots, said vehicle comprising:
a wireless signal receiver for receiving a wireless time reference signal from an external time reference signal source, said time reference signal providing consecutive timing markers separated by a reference time duration;
a microcontroller coupled to the wireless signal receiver, said microcontroller having a clock timer, the wireless signal receiver being coupled to the microcontroller and providing said timing markers to the microcontroller, said microcontroller being configured to calibrate the clock timer using the consecutive timing markers received by the wireless signal receiver and to select at least one indexed time slot of the time division scheme for message broadcasting at the communication device;
a wireless message transceiver, said wireless message transceiver being controlled by said microcontroller to receive and send messages; and
an application message processor coupled to the microcontroller, the application message processor processing status information of the vehicle and package the status information to node messages for the microcontroller to pass to the wireless message transceiver to broadcast during each one of the at least one selected time slot assigned to the vehicle and to process messages received by the wireless message transceiver from all other nodes in indexed time slots not assigned to the local node,
wherein the microcontroller is configured to calibrate the clock timer by calculating clock discrepancy between time provided by the clock timer and time provided by the consecutive timing markers accumulated during the reference time duration, dividing the clock discrepancy accumulated in the reference time duration by number of indexed time slots in the reference time duration, and adjusting time length of each indexed time slots in the reference time duration by the calculated clock discrepancy per time slot to compensate for the clock discrepancy.

13. The vehicle of claim 12, wherein the microcontroller is further configured to:
detect for a transmission collision condition at the local node,
upon the transmission collision condition being detected in one of the at least one selected time slot, deselect the time slot and select a different time slot that is not selected by other nodes.

14. The vehicle of claim 12, wherein the microcontroller is further configured to:
detect a deadlock condition of the local node,
deselect all of the at least one selected time slot assigned to the vehicle and, for each of the at least deselected time slot, select a different time slot not selected by any other nodes and the vehicle.

15. A communication device for installation in a vehicle to establish and maintain vehicular communications among nodes in a two-hop neighborhood in a vehicular ad hoc network (VANET) established according to a media access control ("MAC") protocol, said MAC protocol having a time division scheme dividing a periodic time duration into a plurality of indexed time slots of a pre-selected time length, said communication device comprising:
a wireless signal receiver for receiving a wireless time reference signal at the vehicle from an external time reference signal source, said time reference signal providing consecutive timing markers separated by a reference time duration;
a microcontroller coupled to the wireless signal receiver, said microcontroller having a timer, the wireless signal receiver being coupled to the microcontroller and providing said timing markers to the microcontroller, said microcontroller being configured to calibrate the timer using the consecutive timing markers of the time reference signal received from the wireless signal receiver and to assign at least one indexed time slot to the communication device for message broadcasting;

a wireless message transceiver, said wireless message transceiver being controlled by said microcontroller to broadcast messages in the assigned at least one selected time slot and receive messages in other time slots;

a data communication interface coupled to one or more sensors installed on the vehicle, said one or more sensors collecting status information of the vehicle; and an application message processor coupled to the data communication interface and the microcontroller, the application message processor processing the status information collected by the one or more sensors and package the status information to node messages for the microcontroller to pass to the wireless message transceiver to broadcast during the at least one selected time slot assigned to the vehicle and to process messages received by the wireless message transceiver from all other nodes in the neighborhood in time slots not assigned to the vehicle, wherein the microcontroller is configured to calibrate the timer by calculating clock discrepancy between time provided by the clock timer and time provided by the consecutive timing markers accumulated during the reference time duration, dividing the clock discrepancy accumulated in the reference time duration by number of indexed time slots in the reference time duration, and adjusting time length of each indexed time slots in the reference time duration by the calculated clock discrepancy per time slot to compensate for the clock discrepancy.

16. The communication device of claim 15, further comprising:

a GPS (Global Positioning System) module, said GPS module including said wireless signal receiver, wherein said external time reference signal is time signal provided by a GPS satellite and the consecutive timing markers are the 1PPS (one-pulse-per-second) pulse edge of the GPS time signal, and the GPS module being coupled to the microcontroller and the application message processor to provide location and speed information of the vehicle to the application message processor for inclusion in the status information of the vehicle, wherein said messages broadcast by the wireless transceiver include the location and speed information of the vehicle provided by the GPS module.

17. The communication device of claim 16, further comprising:

an accelerometer, said accelerometer being configured to measure acceleration of the vehicle and providing said acceleration data to the application message processor for inclusion in the status information, wherein said messages broadcast by the wireless transceiver include the acceleration data.

18. The communication device of claim 17, further comprising:

a warning message generator, said warning message generator receiving from the application message processor or directly from the one or more sensors status information of the vehicle and receiving from the application message processor status information of other nodes contained in the messages received by the wireless signal transceiver, and processing the status information of the vehicle and the status information of other nodes to generate warning messages.

19. The communication device of claim 18, wherein the warning message generator classifies the warning messages into categories and generates user alert messages for warning messages belonging to pre-selected categories.

20. The communication device of claim 18, further comprising:

a data storage device stored thereon GPS map data, wherein the application message processor is configured to compute a predicted trajectory of movement of the vehicle, and to generate an internal safety message from the location and speed information, the acceleration data and the projected trajectory of the vehicle and of other nodes.

21. The communication device of claim 19, wherein the warning message generator generates a warning message if the safety message generated by the application message processor indicates imminent danger.

* * * * *